United States Patent
Schneider et al.

(10) Patent No.: US 9,395,535 B2
(45) Date of Patent: Jul. 19, 2016

(54) SYSTEM AND METHOD FOR PRODUCING OPTICAL SINC-SHAPED PULSES

(71) Applicant: ECOLE POLYTECHNIQUE FEDERALE DE LAUSANNE (EPFL), Lausanne (CH)

(72) Inventors: Thomas Schneider, Michendorf (DE); Camille-Sophie Brés, St-Sulpice (CH); Luc Thévenaz, Grendevent (CH); Marcelo Alfonso Soto Hernandez, Lausanne (CH); Mohammad Mehdi Alem Karladani, Lausanne (CH); Mohammad Amin Shoaie, Lausanne (CH); Armand Vedadi-Comte, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 14/704,125

(22) Filed: May 5, 2015

(65) Prior Publication Data
US 2015/0323781 A1    Nov. 12, 2015

Related U.S. Application Data

(60) Provisional application No. 61/989,071, filed on May 6, 2014.

(51) Int. Cl.
| | | |
|---|---|---|
| G02B 26/00 | (2006.01) | |
| G02B 26/06 | (2006.01) | |
| H04B 10/54 | (2013.01) | |
| H04L 27/04 | (2006.01) | |
| G02F 7/00 | (2006.01) | |
| G01J 3/12 | (2006.01) | |
| G01J 3/02 | (2006.01) | |

(52) U.S. Cl.
CPC ............... *G02B 26/06* (2013.01); *G01J 3/0205* (2013.01); *G01J 3/12* (2013.01); *G02F 7/00* (2013.01); *H04B 10/541* (2013.01); *H04L 27/04* (2013.01)

(58) Field of Classification Search
CPC ............. G02B 26/06; G02F 7/00; G01J 3/12; G01J 3/0205; H04B 10/541; H04L 27/04
USPC .......... 359/237, 238, 276, 284, 286, 289, 298
See application file for complete search history.

(56) References Cited

U.S. PATENT DOCUMENTS 6,208,672 B1 *    3/2001    Gunning ............... H01S 5/4006
                                                            372/12

OTHER PUBLICATIONS

Cisco Visual Networking Index: Forecast and Methodology, 2011-2016 (May 30, 2012), 16 pages. (http://www.cisco.com/en/US/solutions/collateral/ns341/ns525/ns537/ns705/ns827/white_paper_c11-481360.pdf).

(Continued)

*Primary Examiner* — Tuyen Tra
(74) *Attorney, Agent, or Firm* — Nixon & Vanderhye P.C.

(57) ABSTRACT

System and methods for producing a plurality of Sinc shaped pulses in the time domain include a light source for providing an input light signal having an input frequency, and at least one spectrum shaper for producing the plurality of Sinc shaped pulses from the input light signal. The spectrum shaper may include an amplitude modulator, at least one radio-frequency generator and a bias voltage generator.

13 Claims, 14 Drawing Sheets

(56) References Cited

OTHER PUBLICATIONS

Richardson, D. J., Filling the Light Pipe. *Science* 330, pp. 327-328 (Oct. 15, 2010).

Essiambre, René-Jean, et al., Capacity Limits of Fiber-Optic Communication Systems. *Proc. OFC 2009*, OThL1 (Mar. 2009), 37 pages.

Essiambre, René-Jean, et al., Capacity Limits of Information Transport in Fiber-Optic Networks. *Phys. Rev. Letters*, PRL 101, 163901 (week ending Oct. 17, 2008), 4 pages.

Essiambre, René-Jean, et al., Capacity Limits of Optical Fiber Networks. *J. Lightwave Technol.* vol. 28, No. 4, pp. 662-701 (Feb. 15, 2010).

Desurvire, E., Capacity demand and technology challenges for lightwave systems in the next two decades. *J. Lightwave Technol.* vol. 24, No. 12, pp. 4697-4710 (Dec. 2006).

Freund, R., et al., Single- and multi-carrier techniques to build up Tb/s per channel transmission systems. Proc. ICTON, Tu.D1.4 (2010), 7 pages.

Bosco, G., et al., On the Performance of Nyquist-WDM terabit superchannels based on PM-BPSK, PM-QPSK, PM-8QAM or PM-16QAM subcarriers. *J. Lightwave Technol.* vol. 29, No. 1, pp. 53-61 (Jan. 1, 2011).

Schmogrow, R., et al., Real-time Nyquist pulse generation beyond 100 Gbit/s and its relation to OFDM. *Optics Express* vol. 20, No. 1, pp. 317-337 (Jan. 2, 2012).

Hillerkuss, D., et al., 26 Tbit/s-[1] line-rate super-channel transmission utilizing all-optical fast Fourier transform processing. *Nature Photonics* vol. 5, pp. 364-371 (Jun. 2011).

Nyquist, H., Certain topics in telegraph transmission theory. *Trans. Am. Inst. Electr. Eng.* 47, pp. 617644 (Feb. 1928).

Hillerkuss, D., et al., Single-Laser 32.5 Tbit/s Nyquist WDM Transmission. *J. Opt. Commun. Netw.* vol. 4, No. 10, pp. 715-723 (Oct. 2012).

Hirooka, T., et al., Highly dispersion-tolerant 160 Gbaud optical Nyquist pulse TDM transmission over 525 km. *Optics Express* vol. 20, No. 14, pp. 15001-15007 (Jul. 2, 2012).

Hirooka, T., & Nakazawa, M., Linear and nonlinear propagation of optical Nyquist pulses in fibers. *Optics Express* vol. 20, No. 18, pp. 19836-19849 (Aug. 27, 2012).

Bosco, G., et. al., Performance Limits of Nyquist-WDM and CO-OFDM in High-Speed Pm-qpsk Systems. *IEEE Photonics Technol. Letters*, vol. 22, No. 15, pp. 1129-1131 (Aug. 1, 2010).

Schmogrow, R., et al., 512QAM Nyquist sinc-pulse transmission at 54 Gbit/s in an optical bandwidth of 3 GHz. *Optics Express* vol. 20, No. 6, pp. 6439-6447 (Mar. 12, 2012).

Proakis, J. G., & Salehi, M., *Digital Communications*. Fifth Edition, McGraw-Hill, 2008.

Nakazawa, M., et al., Ultrahigh-speed "orthogonal" TDM transmission with an optical Nyquist pulse train. *Optics Express* vol. 20, No. 2, pp. 1129-1140 (Jan. 16, 2012).

Schmogrow, R. et al., 150 Gbit/s real-time Nyquist pulse transmission over 150 km SSMF enhanced by DSP with dynamic precision. *Optical Fiber Communication Conference (OFC-2012)*, OM2A.6 (2012), 3 pages.

Vedadi, A., et al., Near-Nyquist optical pulse generation with fiber optical parametric amplification. *Optics Express* vol. 20, No. 26, pp. B558-B565 (Dec. 10, 2012).

Tan, Hung Nguyen, et al., Pass-Drop Operations of 4x172Gb/s Nyquist OTDM-WDM over Cascade of WSSs Using Distributed Matched Filtering. *Optical Fiber Communication Conference/National Fiber Optic Engineers Conference 2013*, JW2A.50 (2013), 3 pages.

Hu, H., et al., Nyquist filtering of 160 GBaud NRZ-like DPSK signal. Optical Society of America, *Optical Fiber Communication Conference/National Fiber Optic Engineers Conference 2013*, JW2A.61 (2013), 3 pages.

Pawlak, M. & Rafajlowicz, E., On Restoring Band-Limited Signals. *IEEE Trans. Inf. Theory* vol. 40, No. 5, pp. 1490-1503 (Sep. 1994).

Valley, G. C., Photonic analog-to-digital converters. *Optics Express* vol. 15, No. 5, pp. 1955-1982 (Mar. 5, 2007).

Supradeepa, V. R. et al., Comb-based radiofrequency photonic filters with rapid tunability and high selectivity. *Nature Photonics* vol. 6, pp. 186-194 (Mar. 2012).

Song, M., et al., Reconfigurable and Tunable Flat-Top Microwave Photonic Filters Utilizing Optical Frequency Combs. *IEEE Photonics Technol. Letters*, vol. 23, No. 21, pp. 1618-1620 (Nov. 1, 2011).

Hamidi, E., et al., Tunable Programmable Microwave Photonic Filters Based on an Optical Frequency Comb. *IEEE Trans. Microwave Theory and Techniques*, vol. 58, No. 11, pp. 3269-3278 (Nov. 2010).

Santagiustina, M. et al., All-optical signal processing using dynamic Brillouin gratings. Scientific Reports, 3, article number: 1594 (2013), 6 pages.

Pestov, D. et al., Optimizing the Laser-Pulse Configuration for Coherent Raman Spectroscopy. *Science* vol. 316, pp. 265-268 (Apr. 13, 2007).

Preußler, S. et al., Quasi-light-storage based on time-frequency coherence. *Optics Express* vol. 17, No. 18, pp. 15790-15798 (Aug. 31, 2009).

Schneider, T., et al., Quasi-Light Storage: a Method for the Tunable Storage of Optical Packets With a Potential Delay-Bandwidth Product of Several Thousand Bits. *J. Lightwave Technol.* vol. 28, No. 17, pp. 2586-2592 (Sep. 1, 2010).

Schmogrow, R. et al., Real-time OFDM or Nyquist pulse generation—which performs better with limited resources? *Optics Express* vol. 20, No. 26, pp. B543-B551 (Dec. 10, 2012).

Schmogrow, R. et al., Pulse-Shaping With Digital, Electrical, and Optical Filters—A Comparison. *J. Lightwave Technol.* vol. 31, No. 15, pp. 2570-2577 (Aug. 1, 2013).

Soto, M. A. et al., Generation of Nyquist sinc pulses using intensity modulators. *CLEO: 2013*, CM4G.3 (2013), 2 pages.

Jinno, M. et al., Spectrum-efficient and scalable elastic optical path network: architecture, benefits, and enabling technologies. *IEEE Communications Mag.* 47, pp. 66-73 (Nov. 2009).

Christodoulopoulos, K., et al., Elastic bandwidth allocation in flexible OFDM-based optical networks. *J. Lightwave Technol.* vol. 29, No. 9, pp. 1354-1366 (May 1, 2011).

Bracewell, R. N., *The Fourier Transform and Its Applications*. Third edition, McGraw-Hill, 2000.

Washburn, B. R. et al., Fiber-laser-based frequency comb with a tunable repetition rate. *Optics Express* vol. 12, No. 20, pp. 4999-5004 (Oct. 4, 2004).

Kubina, P. et al., Long term comparison of two fiber based frequency comb systems. *Optics Express* vol. 13, No. 3, pp. 904-909 (Feb. 7, 2005).

Ruehl, A., et al., 80 W, 120 fs Yb-fiber frequency comb. *Optics Letters* vol. 35, No. 18, pp. 3015-3017 (Sep. 15, 2010).

Bartels, A., et al., Spectrally resolved optical frequency comb from a self-referenced 5 GHz femtosecond laser. *Optics Letters* vol. 32, No. 17, pp. 2553-2555 (Sep. 1, 2007).

Kippenberg, T. J., et al., Microresonator-Based Optical Frequency Combs. *Science* vol. 332, pp. 555-559 (Apr. 29, 2011).

Del'Haye, P. et al., Optical frequency comb generation from a monolithic microresonator. *Nature* vol. 450, pp. 1214-1217 (Dec. 2007).

Koos, C. et al., Terabit/s data transmission using optical frequency combs. *Proc. SPIE* vol. 8600, 860009 (2013), 8 pages.

Pfeifle, J. et al., Microresonator-Based Frequency Comb Generator as Optical Source for Coherent WDM Transmission. *Optical Fiber Communication Conference/National Fiber Optic Engineers Conference 2013*, OW3C.2 (2013), 3 pages.

Wu, R., et al., Generation of very flat optical frequency combs from continuous-wave lasers using cascaded intensity and phase modulators driven by tailored radio frequency waveforms. *Optics Letters* vol. 35, No. 19, pp. 3234-3236 (Oct. 1, 2010).

Ozharar, S., et al., Ultraflat optical comb generation by phase-only modulation of continuous-wave light. *IEEE Photonics Technol. Letters* vol. 20, No. 1, pp. 36-38 (Jan. 1, 2008).

Chang, Q., et al., Generation of optical comb frequency signal with high spectral flatness using two cascaded optical modulators. *Optical Fiber Communication & Optoelectronic Exposition & Conference*.1, SaB4 (2008), 3 pages.

(56) References Cited

OTHER PUBLICATIONS

Yamamoto, T., et al., Spectrally flattened phase-locked multi-carrier light generator with phase modulators and chirped fibre Bragg grating. *Electronics Letters* vol. 43, No. 19 (Sep. 13, 2007), 2 pages.

Yamamoto, T., et al., Multicarrier Light Source With Flattened Spectrum Using Phase Modulators and Dispersion Medium. *J. Lightwave Technol.* vol. 27, No. 19, pp. 4297-4305 (Oct. 1, 2009).

Yang, T. et al., Comparison analysis of optical frequency comb generation with nonlinear effects in highly nonlinear fibers. *Optics Express* vol. 21, No. 7, pp. 8508-8520 (Apr. 8, 2013).

Ataie, V., et al., Generation of 1500-tone, 120nm-wide ultraflat frequency comb by single CW source. *Proc. Optical Fiber Communication & Optoelectronic Exposition & Conference.* PDP5C.1 (2013), 3 pages.

Tong, Z., et al., Spectral linewidth preservation in parametric frequency combs seeded by dual pumps. *Optics Express* vol. 20, No. 16, pp. 17610-17619 (Jul. 30, 2012).

Jiang, Z., et al., Spectral line-by-line pulse shaping. Optics Letters vol. 30, No. 12, pp. 1557-1559 (Jun. 15, 2005).

Jiang, Z., et al., Optical arbitrary waveform processing of more than 100 spectral comb lines. *Nature Photonics* vol. 1, pp. 463-467 (Aug. 2007).

Sadeev, T. S., & Morozov, O. G., Investigation and analysis of electro-optical devices in implementation of microwave photonic filters. *Proc. SPIE.* vol. 8410, 841007 (2012), 8 pages.

Geng, J. et al., Highly stable low-noise Brillouin fiber laser with ultranarrow spectral linewidth. *IEEE Photonics Technol. Letters* vol. 18, No. 17, pp. 1813-1815 (Sep. 1, 2006).

Wooten, E. L. et al., A review of lithium niobate modulators for fiber-optic communications systems. *IEEE J. Sel. Topics Quantum Electronics* vol. 6, No. 1, pp. 69-82 (Jan./Feb. 2000).

Vedadi, A. et al, "Experimental investigation of pulse generation with one-pump fiber optical parametric amplification," Optics Express, vol. 20, No. 24, 11 pages (Nov. 19, 2012).

Cisco Visual Networking Index: Forecast and Methodology, 2013-2018 (Jun. 10, 2014), 14 pages.

Schmogrow, et al, "Real-time Nyquist pulse generation beyond 100 Gbit/s and its relation to OFDM," Optics Express, vol. 20. No. 1, Optics Express, pp. 317-337 (Jan. 2, 2012).

\* cited by examiner

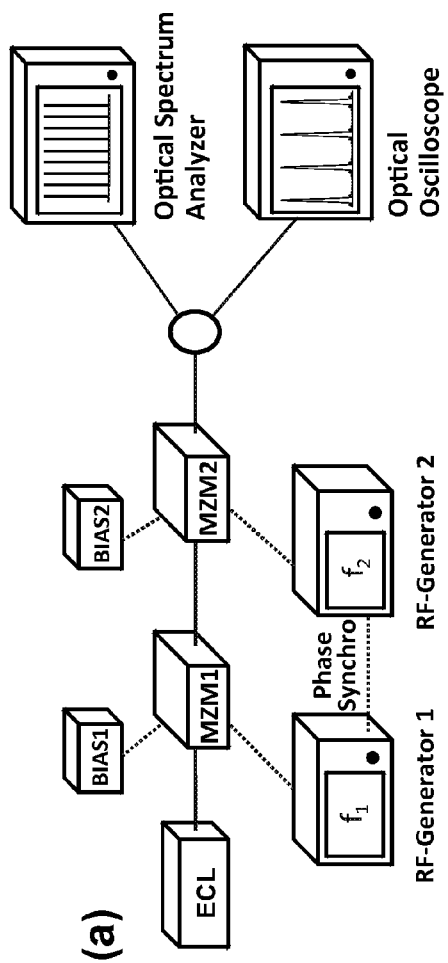
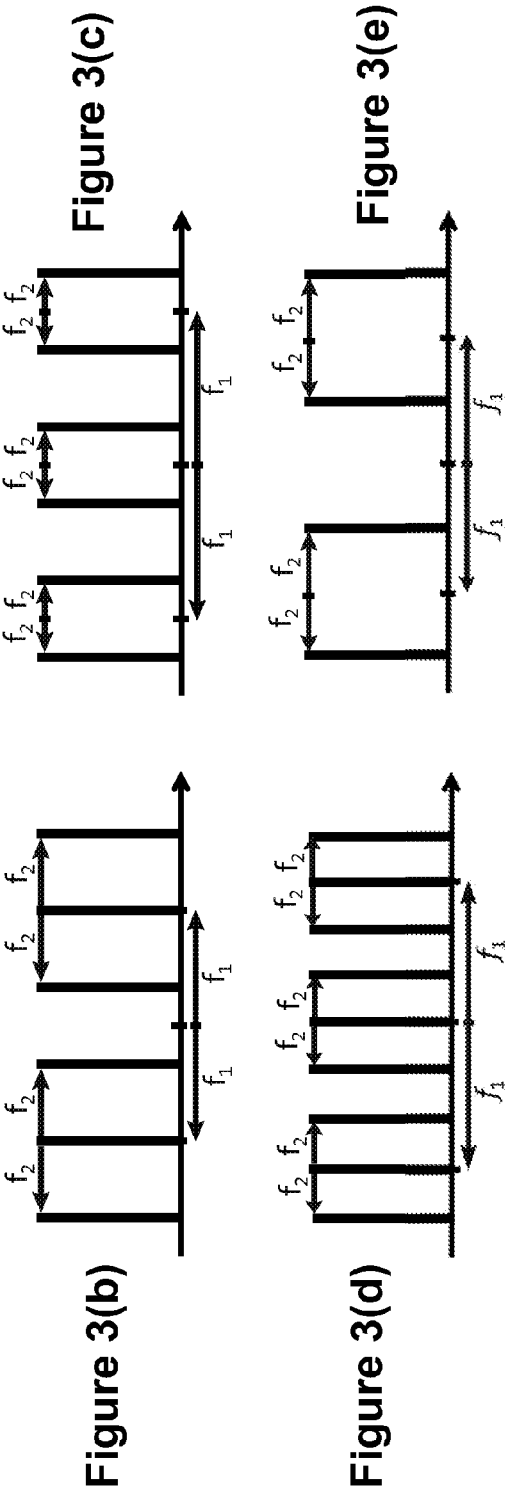
Figure 3(a)
Figure 3(b)
Figure 3(c)
Figure 3(d)
Figure 3(e)

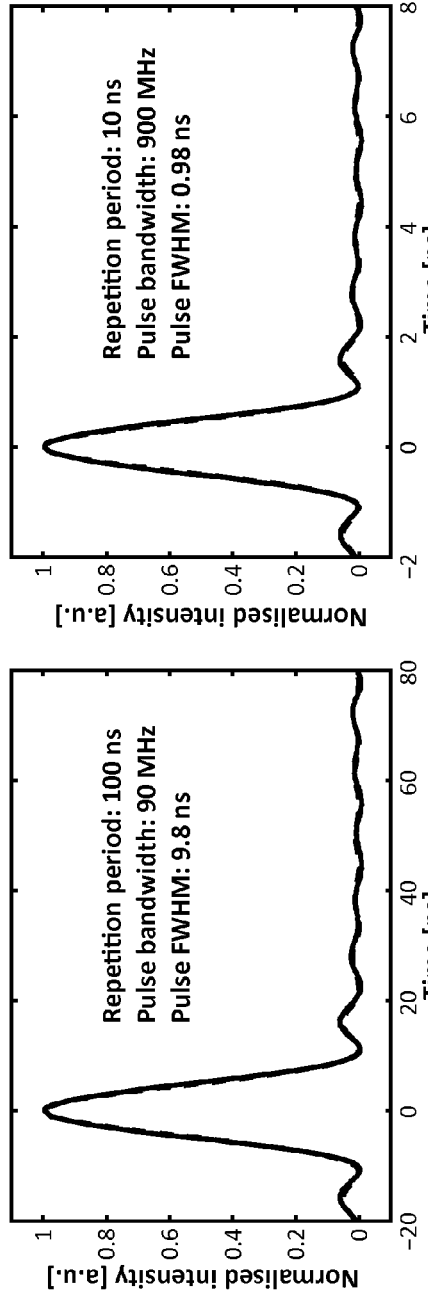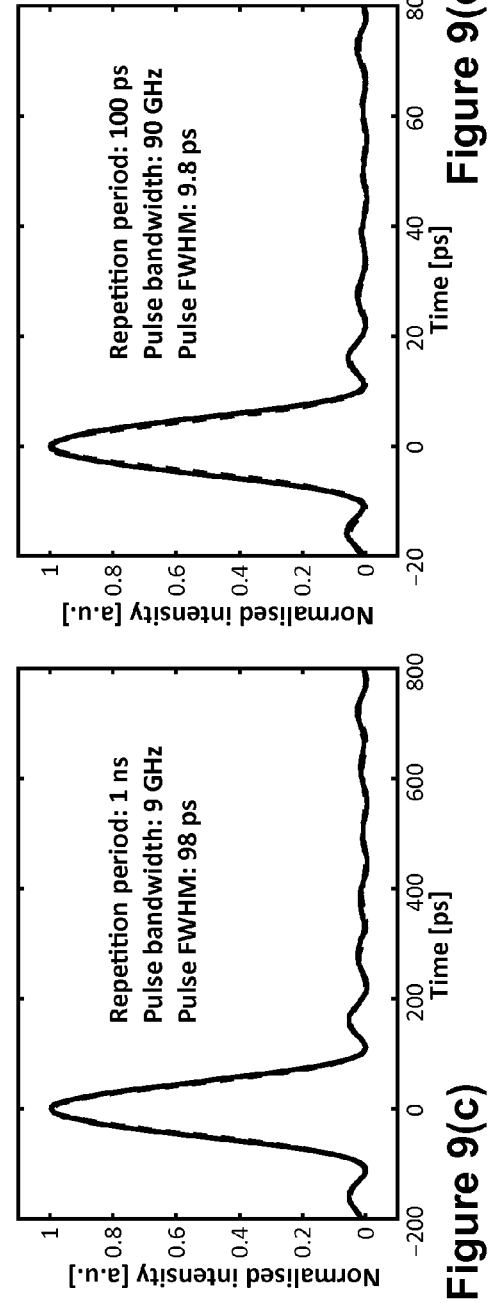
Figure 9(a)
Figure 9(b)
Figure 9(c)
Figure 9(d)

SYSTEM AND METHOD FOR PRODUCING OPTICAL SINC-SHAPED PULSES

CROSS-REFERENCE TO RELATED APPLICATIONS

This application claims the benefit of U.S. provisional application No. 61/989,071, filed May 6, 2014, the entire contents of which are incorporated herein by reference.

FIELD OF THE INVENTION

The present invention relates to all-optical generation of Sinc-shaped pulse-sequences, and in particular to all-optical generation of Nyquist Sinc-shaped pulse-sequences. These pulse-sequences are of particular interest, for example, for high-speed optical communications, test & measurement and sensing.

BACKGROUND OF THE INVENTION

During recent years, many efforts to increase the capacity of optical networks aim at improving the spectral and temporal efficiency of optical communications signals. One method consists in using Sinc pulses, which have the unique property of exhibiting a rectangular spectrum in the frequency domain and satisfy the Nyquist inter-symbol interference (ISI) criterion in the time domain. This means that the data symbols that are carried by Sinc pulses do not interfere with each other, even though the pulses overlap in the time domain. These properties allow for an optimized aggregation in the frequency domain of wavelength division multiplexed (WDM) channels, as well as an orthogonal multiplexing of the symbols in the time domain with no ISI.

The most common technique to generate Nyquist signals in optical telecommunications networks is Nyquist WDM, where the baseband communication signal spectrum to be transmitted is reshaped using digital Nyquist filters before modulation on an optical carrier. Transmission of WDM channels with no guard band and no ISI was demonstrated using Nyquist WDM. The drawback of this method however is the high signal processing capacity needed in order to generate Nyquist WDM signals at high speed. Thus, up to now, Nyquist WDM systems with rather low bandwidths have been demonstrated.

Another approach is to generate Nyquist pulse-sequences in the optical domain. In this approach, an optical Nyquist pulse-sequence is generated and used as the symbol to transmit data on an optical link. The pulse can then be modulated with data and multiplexed in time and/or frequency domain with no ISI and no guard band. Apart from reducing the need for high speed signal processors, the advantage is that one can directly use the generated pulses for other applications but telecommunications, such as optical sampling or sensing. Currently existing methods to generate all-optical Nyquist pulses use expensive equipment, such as mode-locked lasers or optical parametric amplifiers. Moreover, the all-optically generated Nyquist pulses demonstrated so far are not close to the ideal Sinc pulses: in particular they do not exhibit a high quality rectangular spectrum.

SUMMARY OF THE INVENTION

The present invention relates to a method and system to generate a sequence of very high quality Sinc-shaped Nyquist pulses with an almost ideal rectangular spectrum. The method consists in a discrete synthesis of a rectangular-shaped phase-locked comb in the frequency domain. A frequency comb is a light source whose spectrum is composed of equally spaced spectral lines. The lines of the comb have equalized amplitudes and they are equally spaced at frequency $f_R$. The number N of lines as well as the spacing between the lines ($f_R$) can be chosen arbitrarily. The phase difference between the spectral lines must have a linear dependence with respect to frequency and the out-of-band components must be strongly suppressed to provide a high-quality rectangular-shaped comb, as the one shown in FIG. 1a. In the time domain, this will be automatically translated into a train of Sinc pulses of repetition rate $f_R$ and the pulse-width (defined as the spacing between the two zeroes in the vicinity of the peak) is $t_p=2/(Nf_R)$ (see FIG. 1(b)). Such pulses satisfy the ISI Nyquist criterion in the time domain and exhibit a rectangular spectrum.

The method to generate the comb consists in using a finite number M of discrete modulating devices, such as optical intensity modulators. Although the use of cascaded modulating devices (see FIG. 2) is preferred for a multiplied generation of spectral lines, a parallel implementation of these devices is also possible (see FIG. 4). Each modulator i (with $1 \leq i \leq M$) can be driven by a number R of radio frequency (RF) sinusoidal waves (so called RF tones), so that a flat optical comb with a determined number of equally spaced and leveled lines is obtained at the output of the block. An RF tone at frequency f is essentially a monochromatic radio frequency signal whose temporal variation follows the sinusoidal function A sin($2\pi$ft), being A the amplitude of the RF tone. The amplitude of the RF tones and the bias voltage of each modulator are adjusted and controlled to equalize the generated spectral lines, while the phase of each RF tone is tuned to obtain a linear phase-locking between each of them. Modulator bias voltages and RF tone amplitudes also determine the number N of frequency lines of the generated optical comb. Note that the maximum spacing and overall comb bandwidth is scaled by the bandwidths of the used modulators.

Compared to the spectral shape resulting from existing methods, one of the main characteristics of the generated comb is the high-quality rectangular shape that can be achieved with very sharp edges, i.e. with the out-of-band frequency components kept below any determined value.

BRIEF DESCRIPTION OF THE DRAWINGS

FIG. 1(a) illustrates the spectrum of a flat frequency comb with N=9 spectral lines and frequency difference $f_R$=10 [GHz], occupying $Nf_R$=90 [GHz] optical bandwidth. FIG. 1(b) shows the time-domain representation of the comb as a train of optical sinc-shaped Nyquist pulses with period $$\frac{1}{f_R} = 100 [\text{ps}]$$

and zero-crossing pulse-width of $$t_P = \frac{2}{Nf_R} = 22.2 [\text{ps}].$$

Figure 2:
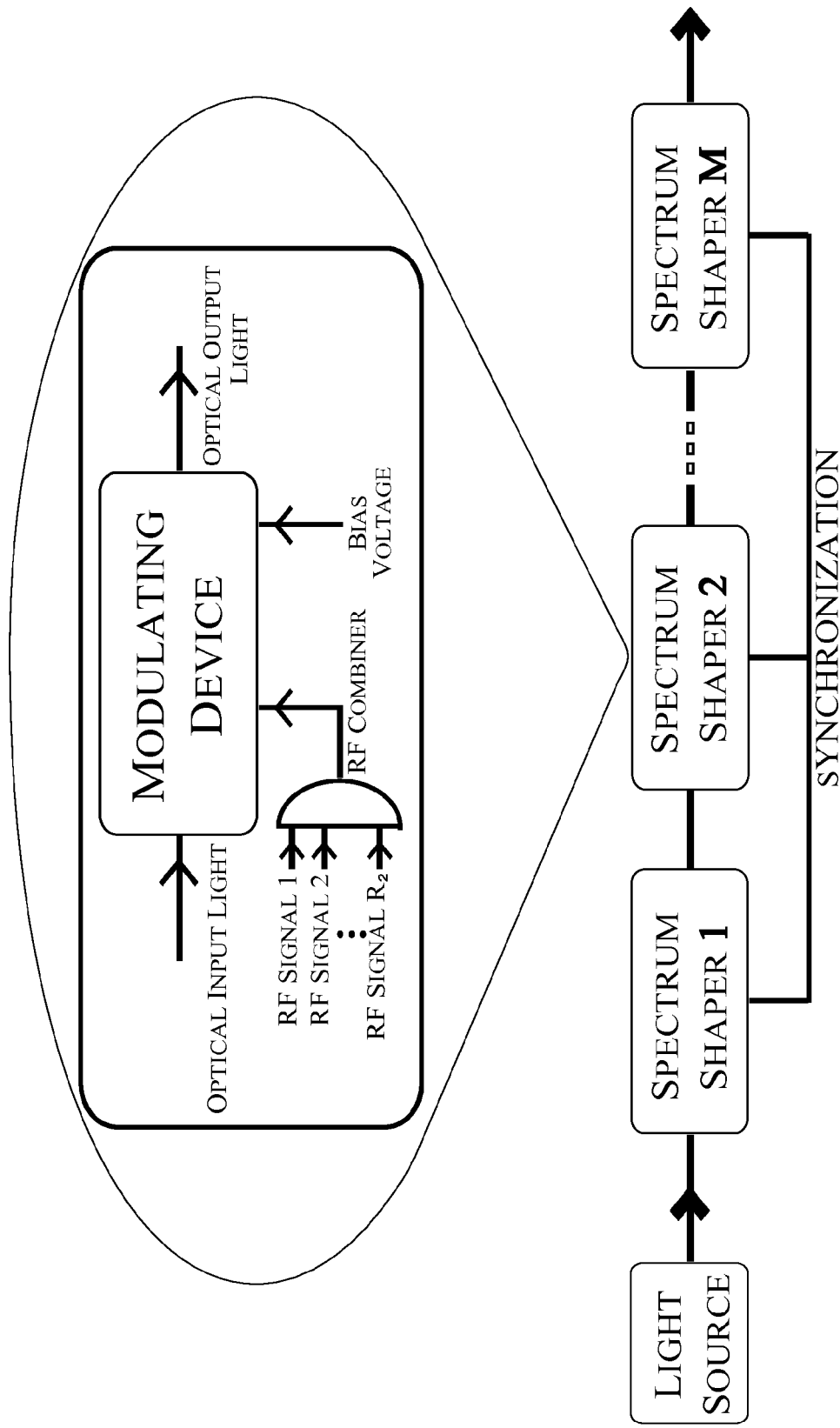

FIG. 2 illustrates a cascaded scheme of the present invention containing M cascaded spectrum shapers. A spectrum shaper can be realized by an optical modulating device with a combination of several RF signals and a bias voltage as shown in the bulb (bubble). Each spectrum shaper multiplies the incoming number of optical carriers (frequency lines) by a certain number that depends on the number of RF signals driving the modulator.

FIG. 3(a) illustrates an exemplary realization of the cascaded scheme. FIG. 3(a) illustrates a possible realization of the scheme in FIG. 2 with an external cavity laser (ECL) as the light source, and two Mach-Zehnder modulators (MZM) as the spectrum shapers. Each modulator produces 2 or 3 spectral lines depending on suppressed or unsuppressed carrier operation, respectively. Hence, this configuration can generate a comb with 4, 6 or 9 lines.

FIG. 3(b) shows a 6-line frequency comb obtained by suppressing the MZM1 carrier so that $2f_1=3f_2$.

FIG. 3(c) shows a 6-line frequency comb obtained by suppressing the MZM2 carrier so that $f_1=4f_2$.

FIG. 3(d) shows a 9-line frequency comb generated without any carrier suppression with $f_1=3f_2$.

FIG. 3(e) shows a 4-line frequency comb generated by carrier suppression in both modulators with $f_1=2f_2$. The realization illustrated here in FIG. 3(e) is presented and described using a distinct single RF tone on each modulator. However, realizations using multiple RF tones on each modulator, like represented in the bubble of FIG. 2, are possible to further extend the number of generated lines well above 9 lines.

Figure 4:
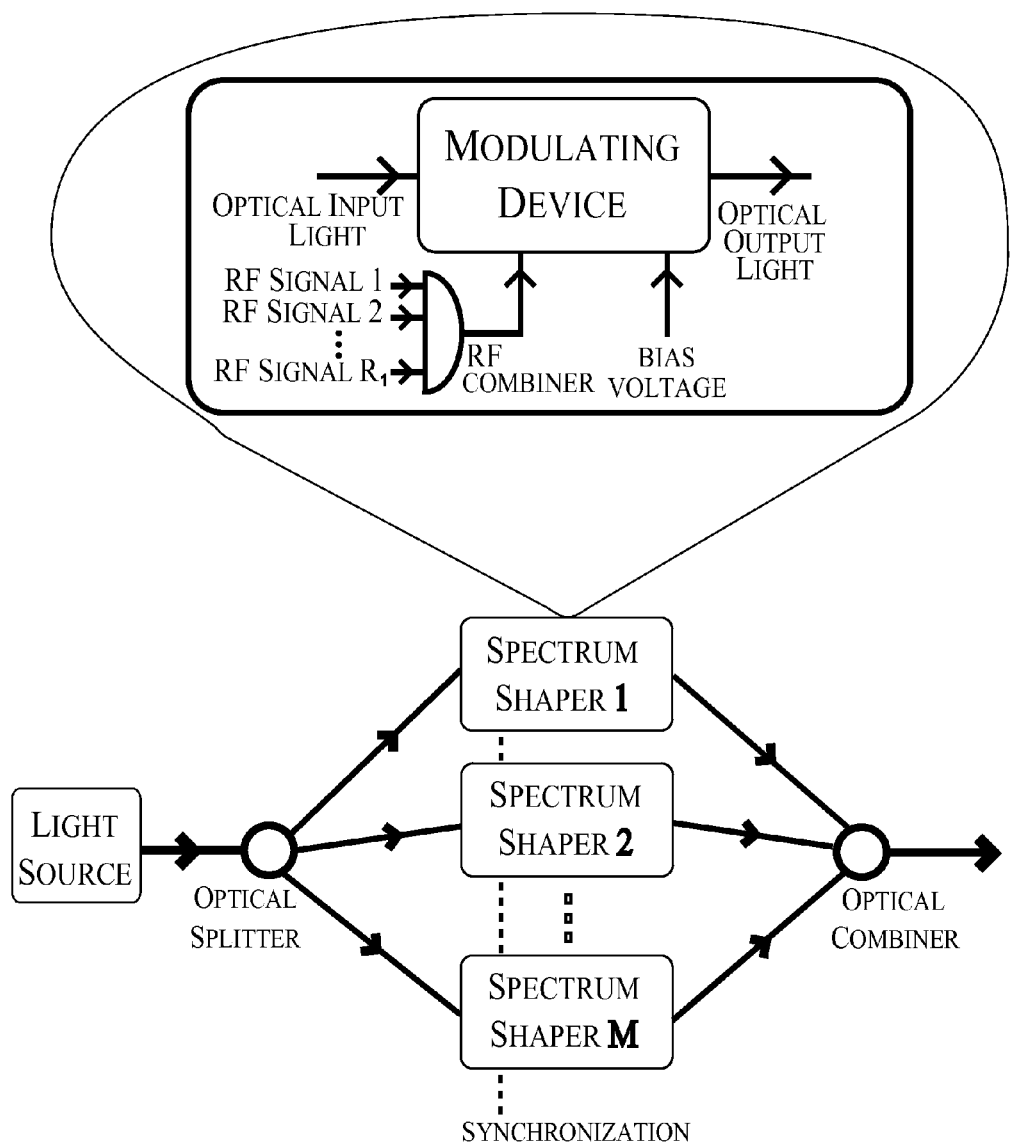

FIG. 4 illustrates a parallel scheme of the present invention containing M spectrum shapers placed in parallel. Each spectrum shaper modulates the incoming light with $R_i$ RF tones at different frequencies. The total number of lines is given by the sum of the number of lines at different frequencies generated by all parallel spectrum shapers.

Figure 5:
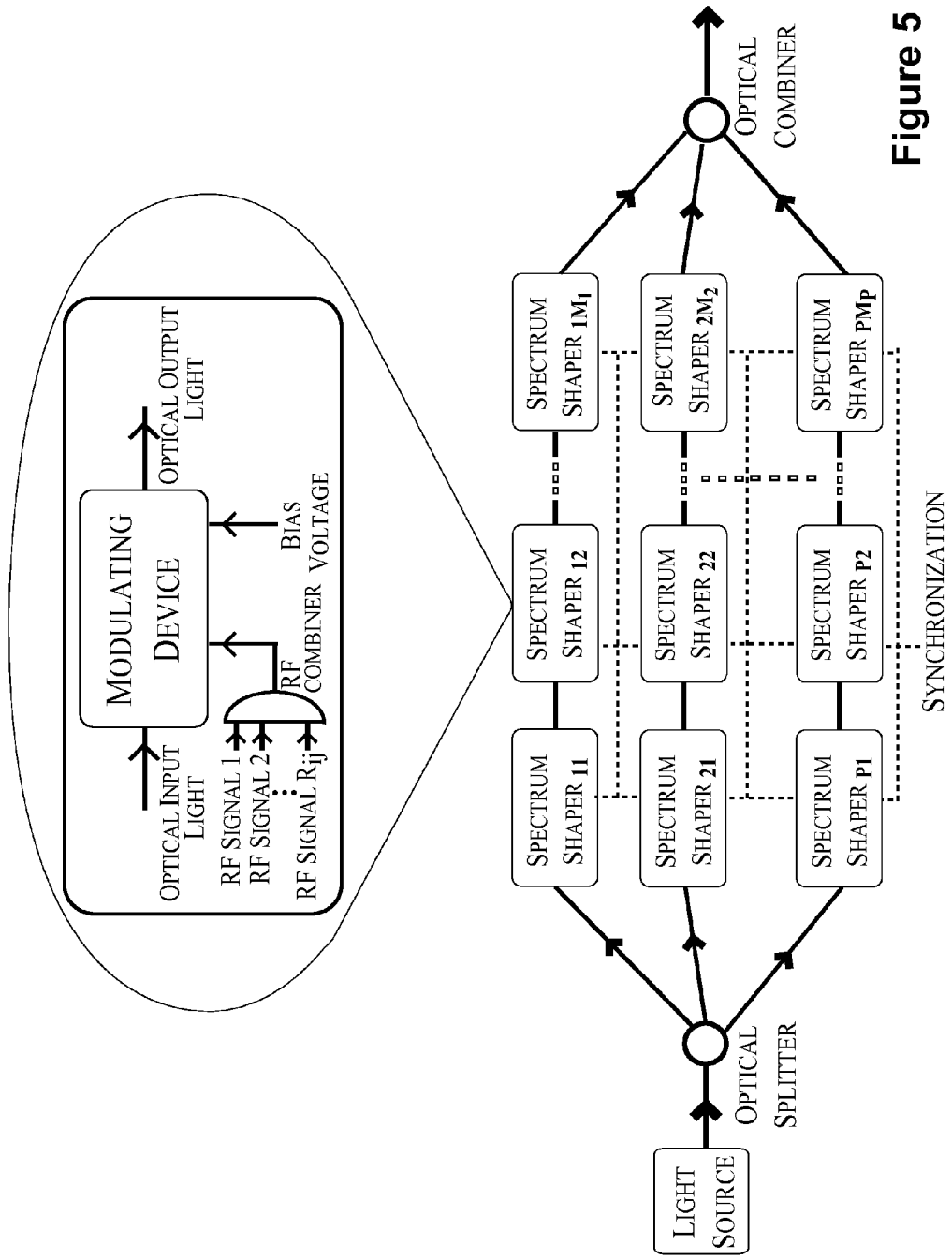

FIG. 5 illustrates a serial-parallel scheme of the present invention containing P parallel branches each one containing $M_i$ spectrum shapers placed in cascade. Each spectrum shaper modulates the incoming light with $R_{ij}$ RF tones at different frequencies. The total number of spectrum shapers is $\Sigma_{i=1}^{P} M_i$.

Figure 6:
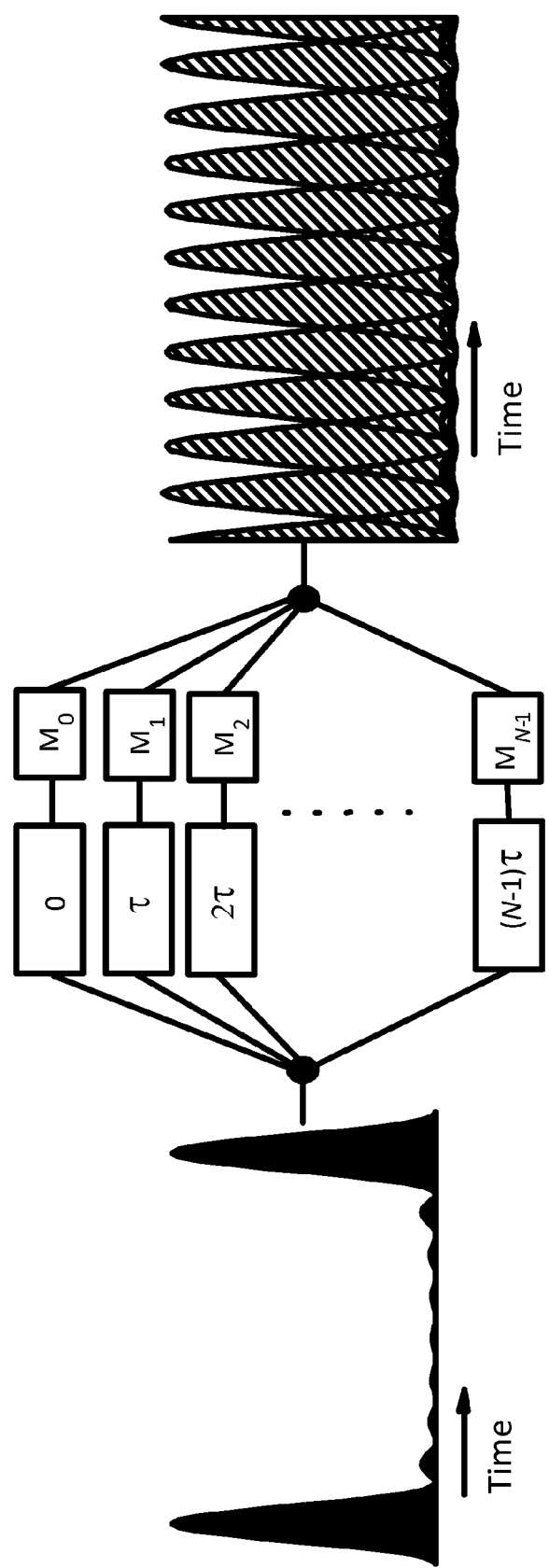

FIG. 6 illustrates a possible multiplexing of sinc-shaped Nyquist pulses. Periodic sinc-pulse sequences can be split into N branches, each of which corresponds to an independent channel. In the n-th branch, the periodic sequence is delayed by n times the interval $\tau=1/(N\Delta f)$, with n=0, . . . , N−1. Each channel can be modulated independently with a modulator $M_0$, . . . , $M_{N-1}$. These devices can apply any modulation formats to the signal. Then, the N modulated channels are multiplexed. The shown multiplexing is carried out in the time domain at one carrier wavelength. Since the multiplexed channel shows a sharp-edged spectrum, the next wavelength channel can be directly adjacent to the previous with almost no guard band and can be multiplexed in the time domain in the same way, reaching high temporal and spectral densities together.

Figure 7A:
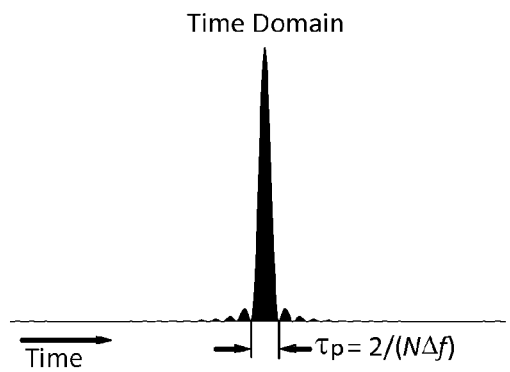
Figure 7B:
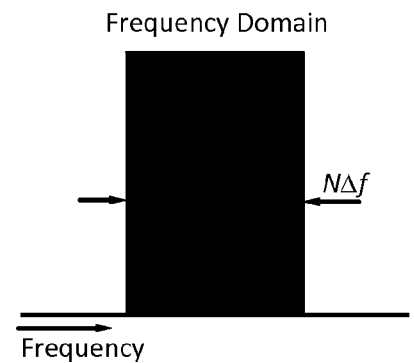
Figure 7C:
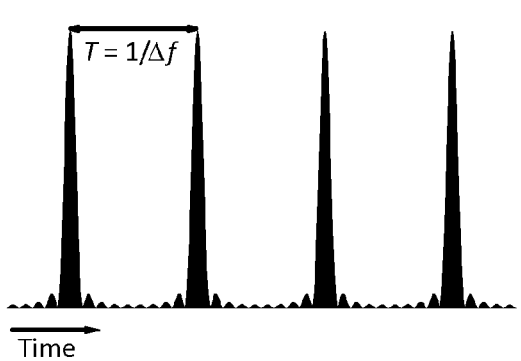
Figure 7D:
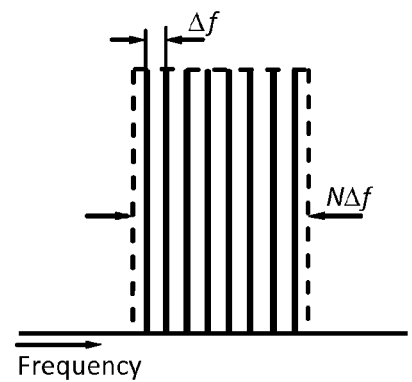

FIGS. 7(a), 7(b), 7(c) and 7(d) illustrates a time-frequency correspondence for sinc-shaped Nyquist pulses. Time (left) and frequency (right) representation of a single sinc pulse (top) and a sinc-pulse sequence (bottom). Since the directly observed quantity in the optical domain is proportional to the optical intensity (or power), here the FIGS. 7(a)-7(d) show the intensity of the time-domain traces instead of the field amplitude. FIGS. 7(a) and 7(b) show that the Fourier domain representation of a sinc pulse is a rectangular function, while FIGS. 7(c) and 7(d) show that the spectrum of an unlimited sinc-pulse sequence is a frequency comb with uniform phase under a rectangular envelope.

Figure 8A:
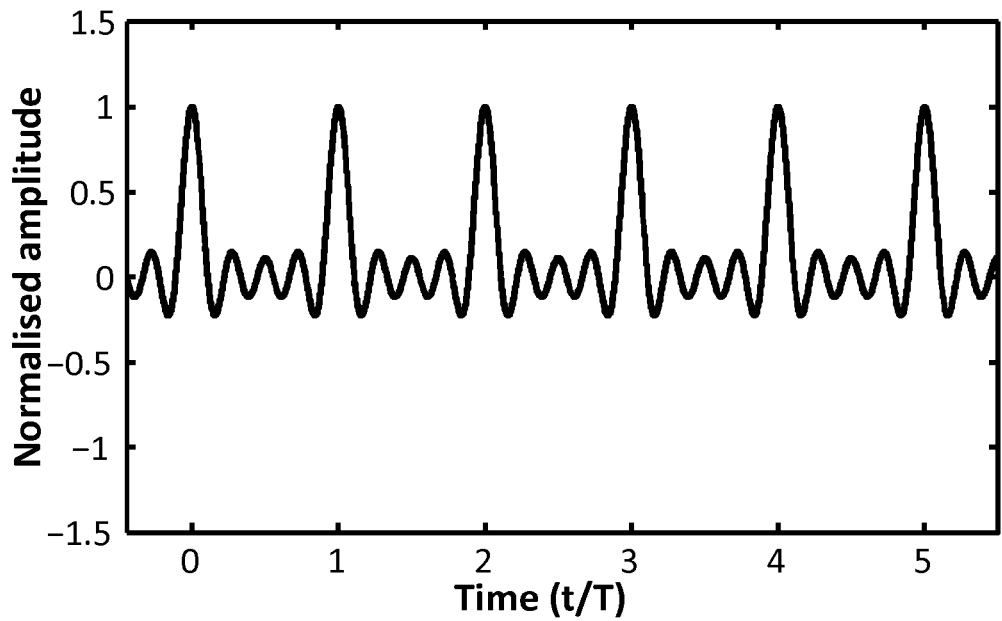
Figure 8B:
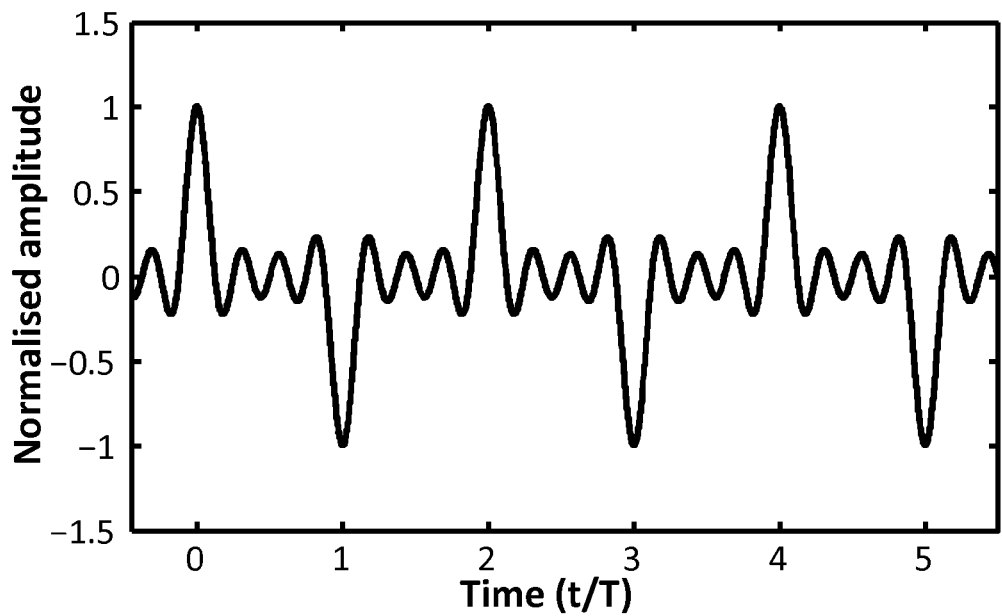

FIGS. 8(a) and 8(b) each show a normalised field envelope of a frequency comb. FIG. 8(a) shows Odd [N=9] and FIG. 8(b) an even [N=8] number of spectral lines. The time axis is normalised with respect to the pulse period T. An odd number of fines leads to a sequence of in-phase sine-shaped Nyquist pulses, while an even number N results in a sequence with alternated π-phase modulated pulses.

FIGS. 9(a), 9(b), 9(c) and 9(d) illustrate the tunability of sinc-shaped Nyquist pulses using 9 spectral lines. Sinc-shaped Nyquist pulses are measured using a 500 GHz optical sampling oscilloscope. The calculated waveforms (dashed lines) according to Eq. (10) herein are compared with the measured pulses (black straight lines) for different bandwidth conditions over 4 decades. Nyquist pulses are obtained from the generation of a rectangular frequency comb with 9 phase-locked components spanning over a spectral width between 90 MHz and 90 GHz, using modulating frequencies FIG. 9(a) $f_1=30$ MHz and $f_2=\Delta f=10$ MHz, FIG. 9(b) $f_1=300$ MHz and $f_2=\Delta f=100$ MHz, FIG. 9(c) $f_1=3$ GHz and $f_2=\Delta f=1$ GHz, and FIG. 9(d) $f_1=30$ GHz and $f_2=\Delta f=10$ GHz. The maximum difference between measured pulses and theoretical ones remained in all cases below 1%.

Figure 10A:
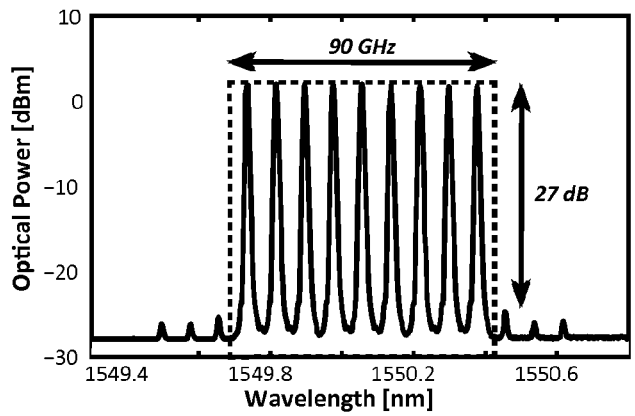
Figure 10B:
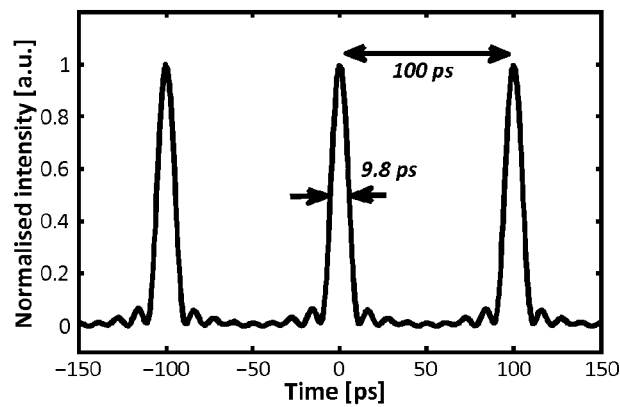
Figure 10C:
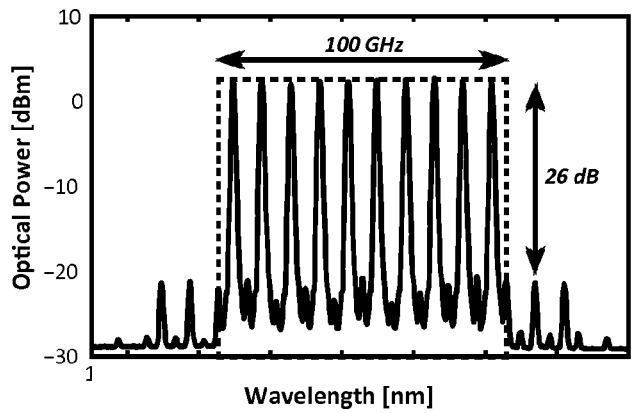
Figure 10D:
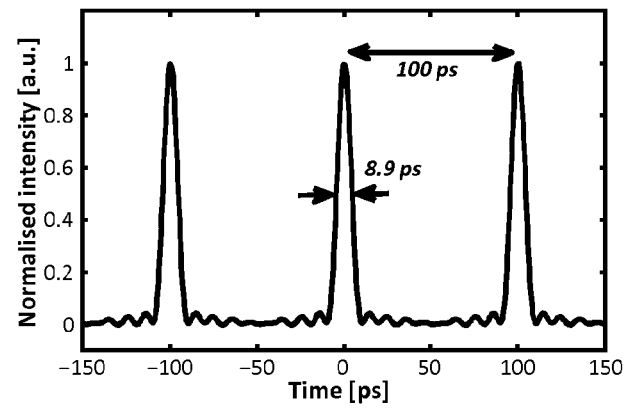
Figure 10E:
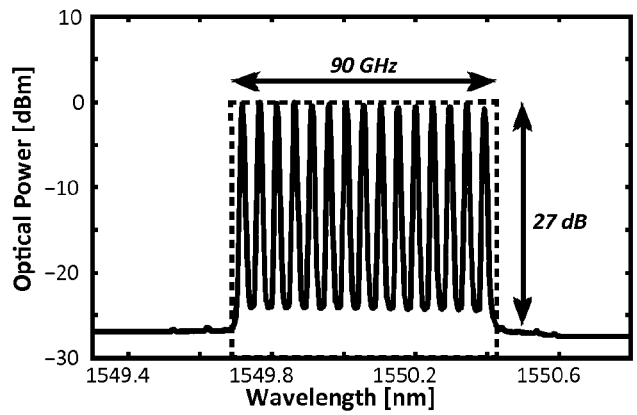
Figure 10F:
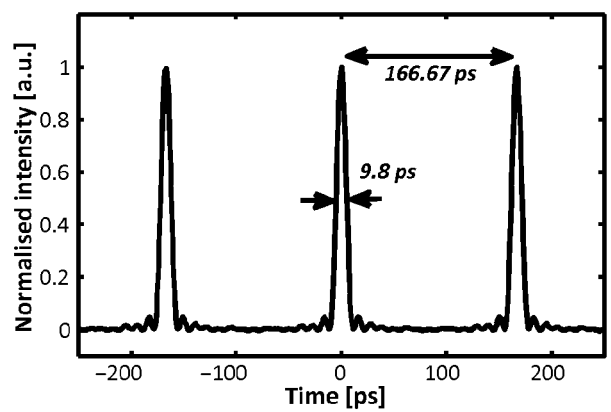
Figure 10G:
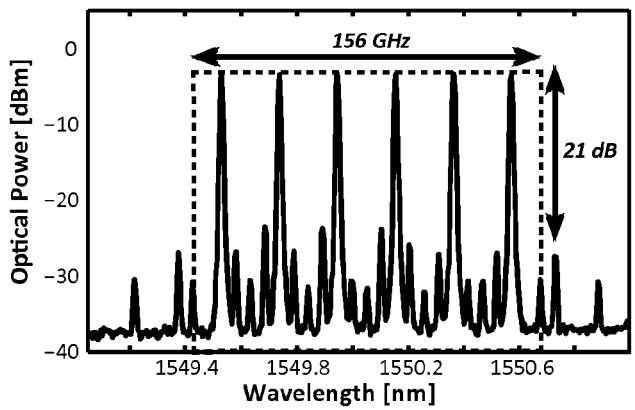
Figure 10H:
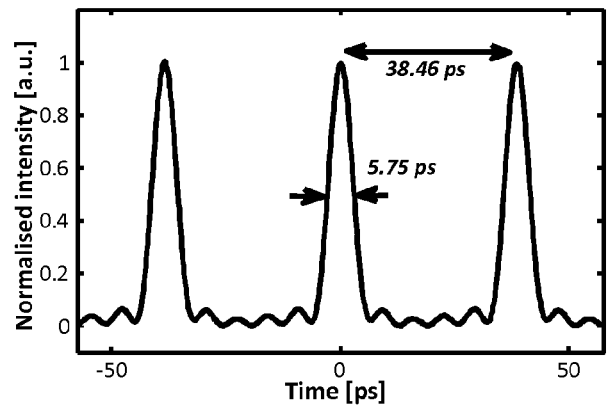

FIGS. 10(a), 10(b), 10(c), 10(d), 10(e), 10(f), 10(g) and 10(h) show a frequency and time-domain representation of the generated sinc-shaped Nyquist pulses. Pulse duration and repetition rate can be easily modified by adjusting the bias voltage of the modulators as well as the frequency and amplitude of modulating signals. Frequency combs with different bandwidth and number of spectral components have been experimentally generated. FIG. 10(a) shows a measured spectrum and FIG. 10(b) a measured time-domain waveform of a comb generated with N=9 spectral components separated by $\Delta f=10$ GHz, and expanding over a bandwidth of 90 GHz. FIG. 10(c) shows a spectrum and FIG. 10(d) a time-domain waveform of a comb generated with N=10, $\Delta f=10$ GHz, and bandwidth of 100 GHz. FIG. 10(e) shows a spectrum and FIG. 10(f) a time-domain waveform of a comb generated with N=15, $\Delta f=6$ GHz, and bandwidth of 90 GHz. FIG. 10(g) shows a spectrum and FIG. 10(h) a time-domain waveform of a comb with N=6, $\Delta f=26$ GHz, and an extended bandwidth of 156 GHz. The comb has been spectrally broadened using the second-order sidebands of the first MZM. A power difference among spectral components lower than 0.2 dB is obtained in all cases. The dashed line boxes in FIGS. 10 (a), (c), (e) and (g) represent the theoretical Nyquist bandwidth of the generated sinc pulses. Spectral measurements are obtained with a resolution of 0.01 nm, temporal waveforms acquired with a 500 GHz optical oscilloscope using a sampling interval of 0.2 ps and 2 time-averaged traces. Only the waveform in FIG. 10(h) is measured with 8 times averaging.

Figure 11A:
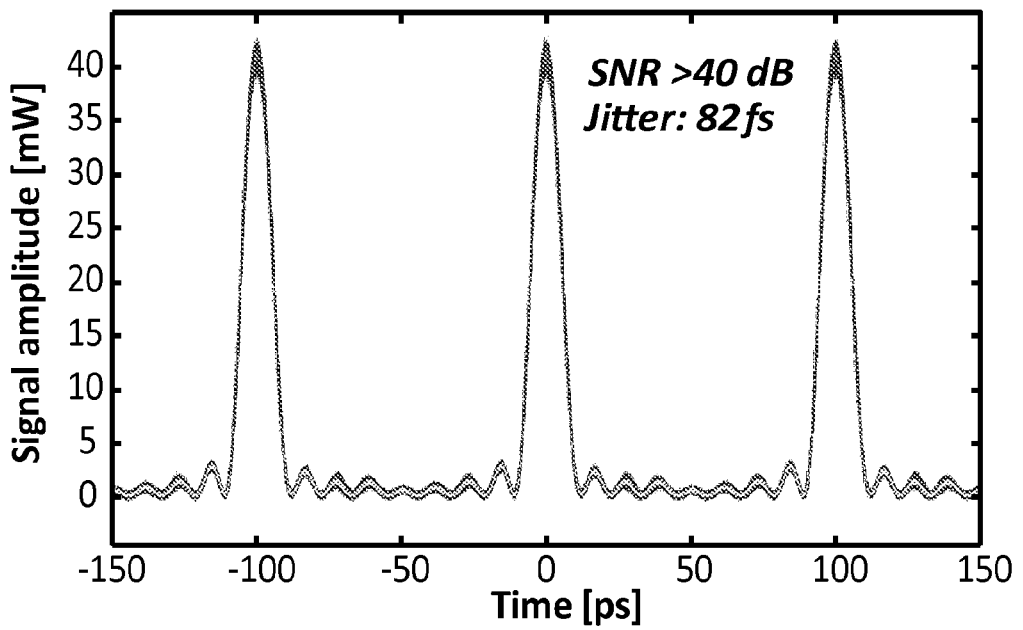
Figure 11B:
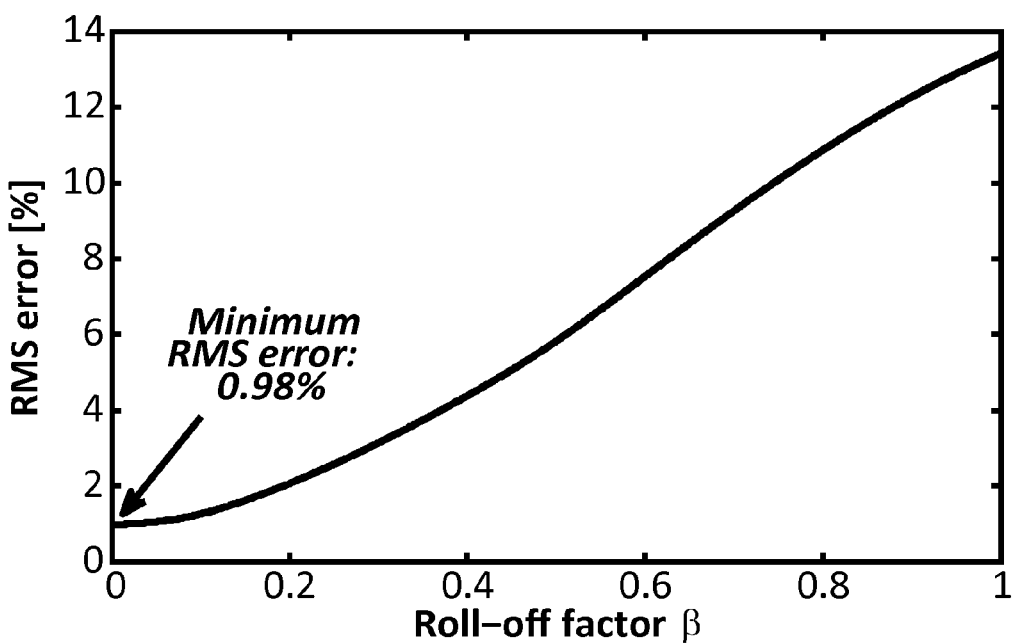

FIGS. 11(a) and 11(b) shows the high stability and quality of periodic sinc pulses. FIG. 11(a) shows a colour-grade figure for one of the measured sinc pulse sequences. In this case a frequency comb with N=9 spectral components separated by $\Delta f=10$ GHz is generated (corresponding to the case depicted in FIGS. 10(a)-(b), but with no averaging). Measurement indicates a jitter of 82 fs and a signal-to-noise ratio greater than 40 dB. Other generated pulse sequences exhibit similar levels of jitter and SNR. FIG. 11(b) shows a root-mean-square (RMS) error between measured pulses and the theoretical Nyquist pulse intensity derived from Eq. (1) herein as a function of the roll-off factor β. The RMS error is minimised for β=0, indicating that the generated pulses match very well the ideal sinc shape with an error of 0.98%. Waveforms measured with other modulating frequencies exhibit similar behaviour.

Figure 12B:
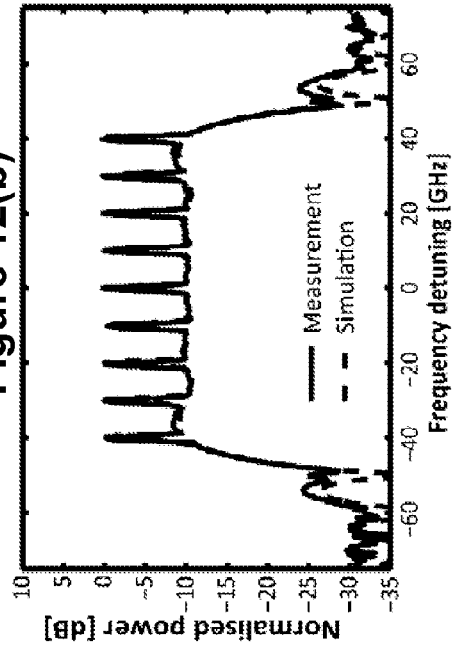
Figure 12D:
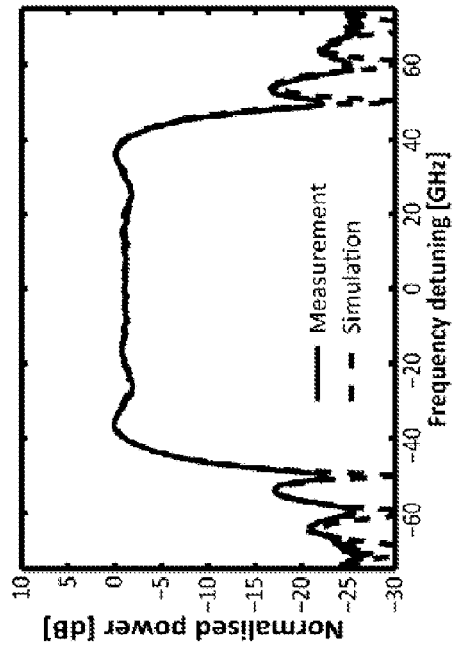
Figure 12A:
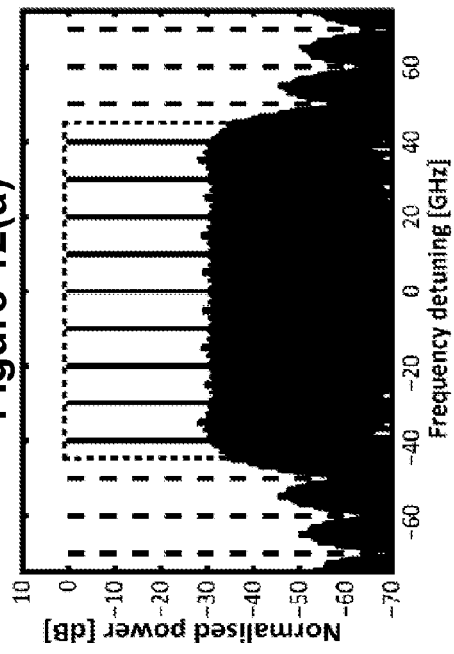
Figure 12C:
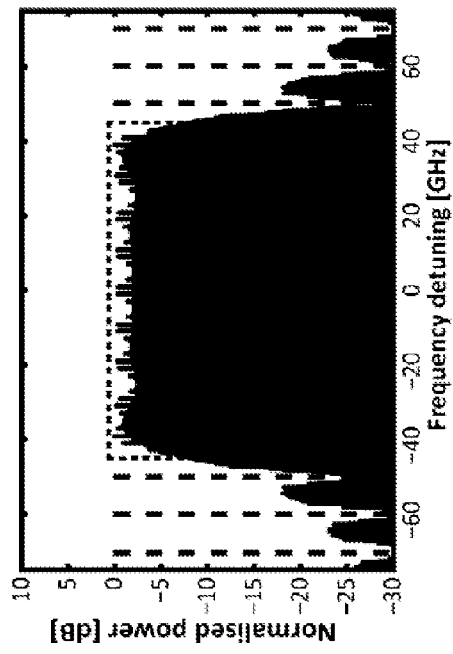

FIGS. 12(a), 12(b), 12(c) and 12(d) show a spectrum of modulated sinc pulses. FIG. 12(a) shows a simulated spectrum resulting from modulating ideal sinc-shaped pulses with on-off keying (OOK) format, using an ideal rectangular modulating window. FIG. 12(b) shows a measured spectrum obtained from the OOK modulation of the generated sequence of sinc-shaped pulses using a PRBS of length $2^{31}-1$. The measured spectrum (black straight line) is compared with the simulated one reported in (a) convolved with the finite spectral bandwidth (0.01 nm) of the optical spectrum analyser (dashed line). FIG. 12(c) shows a simulated spectrum resulting from modulating ideal sinc-shaped pulses with binary phase-shift keying (BPSK) format using an ideal rectangular modulating window. FIG. 12(d) shows a measured spectrum obtained from modulating the generated sequence of sinc-shaped pulses with BPSK. The measured spectrum (black straight line) is compared with the simulated one reported in FIG. 12(c) convolved with the filtering bandwidth of the OSA (dashed line). The dotted boxes in FIGS. 12(a) and 12(c) show the rectangular spectrum of one single pulse and the dashed lines indicate the position of the two adjacent WDM channels, showing that although the spectrum is broadened by the modulation no guard band between the channels is necessary.

Figure 13A:
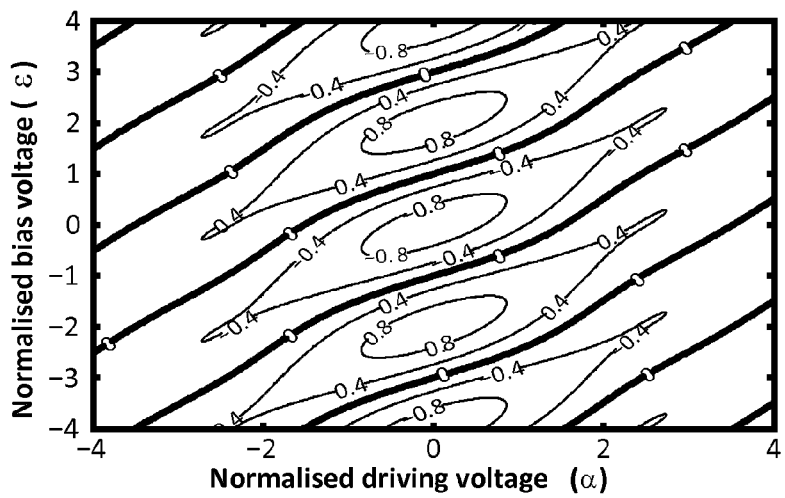
Figure 13B:
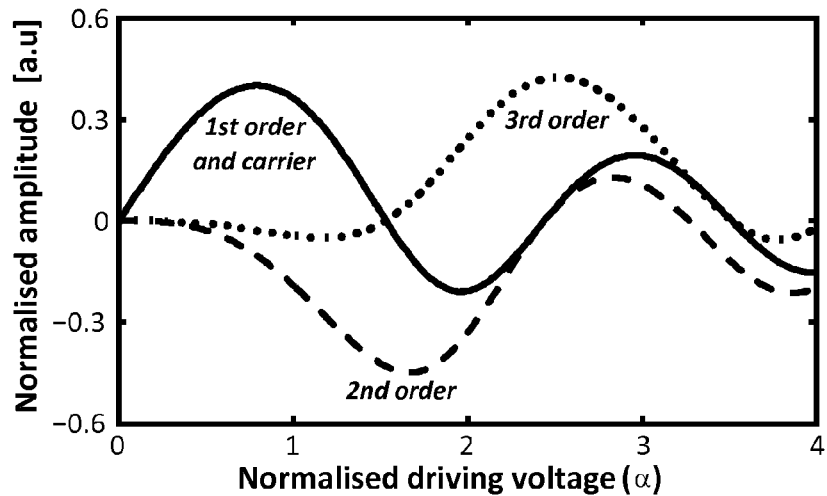
Figure 13C:
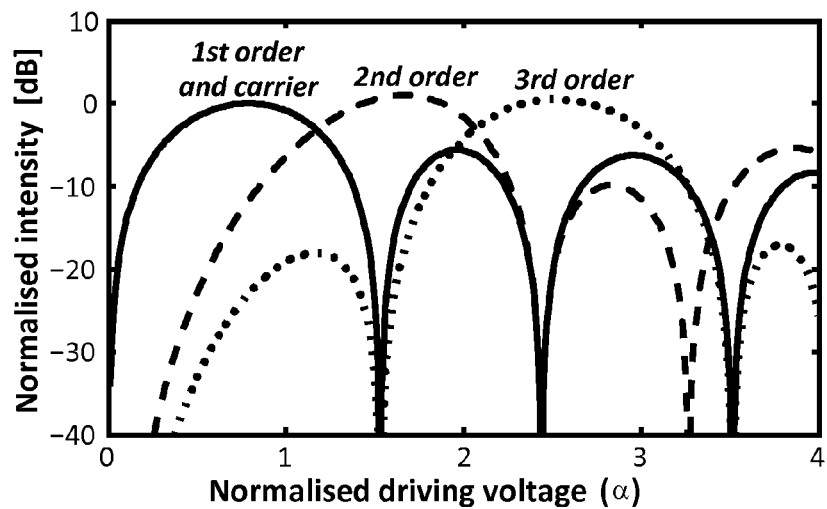

FIGS. 13(a), 13(b) and 13(c) illustrate rectangular frequency comb generation with MZMs. FIG. 13(a) shows an amplitude difference between first-order sidebands and carrier component $[-J_1(\pi\alpha/2)\sin(\pi\epsilon/2)-J_0(\pi\alpha/2)\cos(\pi\epsilon/2)]$. Equalisation of the amplitude between the two first-order sidebands and carrier is only possible if pairs of bias voltage $\epsilon$ and driving voltage $\alpha$ lying over the thick black line at zero level are used. This amplitude equalisation not only leads to frequency components with the same power level but also ensures the same phase between them. FIG. 13(b) illustrates a field amplitude and FIG. 13(c) the power of the three lower-order sidebands as a function of the normalised RF voltage, when the DC bias is set to equalise carrier and first-order sideband amplitudes. Power levels have been normalised to the maximum power reached by the first-order sidebands.

DETAILED DESCRIPTION

Figure 1B:
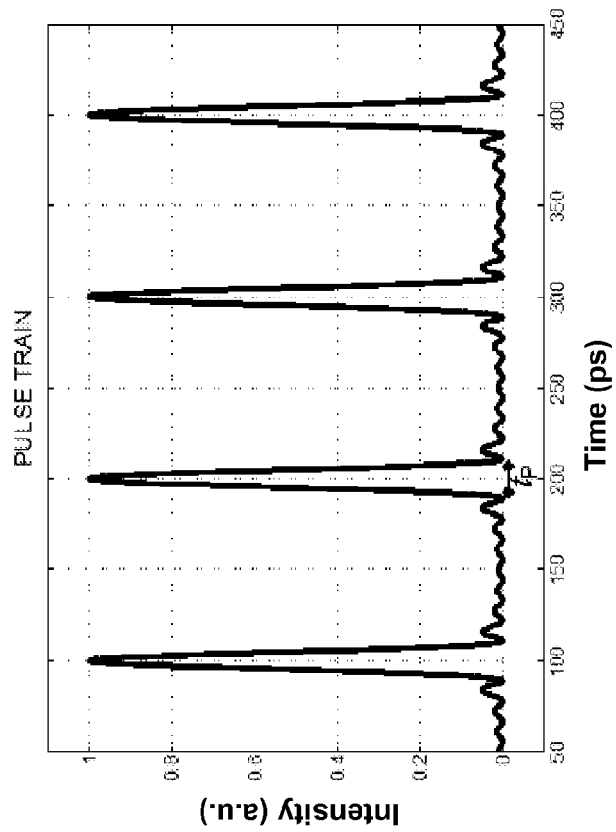
FIGS. 1(a) and 1(b) illustrate time-frequency duality.
Figure 1A:
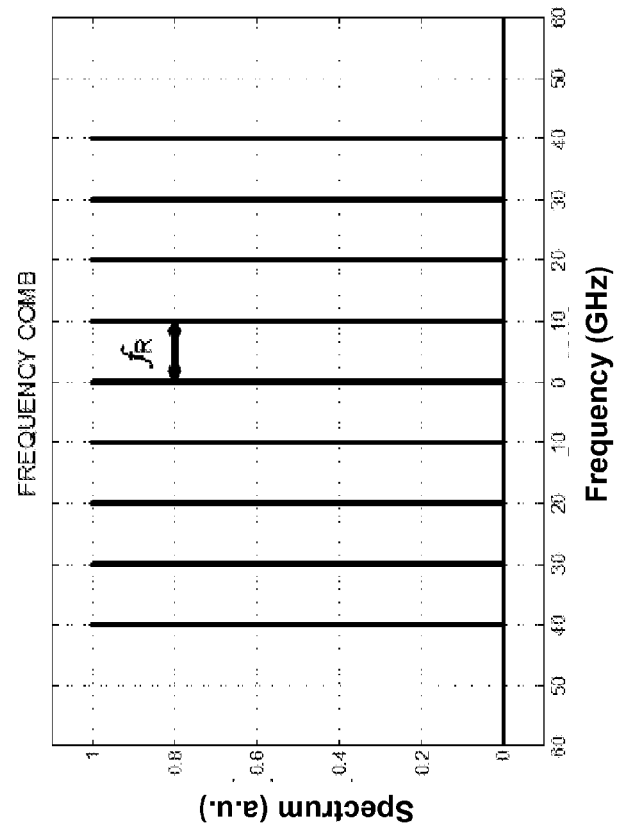

The principle of the method and system according to the present invention is based on the time-frequency duality described by Fourier analysis (described by FIGS. 1(a)-1(b)). A sinc pulse can be represented by a rectangular spectrum in the frequency (Fourier) domain, while the frequency content of a train of sinc pulses corresponds to a flat comb with equally-spaced and same level components within the bandwidth defined by the single pulse spectrum. Therefore, instead of shaping a single sinc pulse, the present invention produces a sequence of sinc pulses directly from the synthesis of an optical frequency comb having uniformly-spaced components with narrow linewidth, equal amplitude, and linear locked phase, together with strong outer-band suppression. The comb is generated symmetrically to the optical carrier frequency $f_0$. The frequency spacing between the lines ($f_R$) defines the repetition rate of the pulses while the bandwidth $B_w$ of the comb defines the pulse width. The bandwidth of the comb is in turn defined by the number of lines and the frequency spacing, so that $B_w=Nf_R$.

Thus, by choosing N and $f_R$, it is possible to generate high quality Sinc pulses with the desired repetition rate and width. These pulses satisfy the Nyquist ISI criterion, so that they can be multiplexed in the time domain at a repetition rate $1/(Nf_R)$ with no inter-symbol interference (ISI). As a consequence, N different trains of pulses can be modulated in phase or intensity, or a combination of both, at a symbol (baud) rate equal to $f_R$ and then time multiplexed to reach a throughput of $Nf_R$ without any interference between the multiplexed symbols. Furthermore, these pulses can be generated at any arbitrary optical carrier frequency $f_0$. It is thus possible to generate multiple wavelength channels of Nyquist pulses, each transporting data at baud rate $Nf_R$. By selecting $B_w=Nf_R$ as the frequency spacing between optical carriers, it is possible to multiplex these channels in wavelength with no guard band and to send data at the Nyquist rate: to transmit p channels at $B=pB_w$ bauds, a spectrum bandwidth of B Hz is sufficient. This is the minimum bandwidth that is theoretically needed.

FIG. 2 depicts an embodiment for generating flat and phase-locked combs using a cascade of 'spectrum shapers'. Each spectrum shaper i has the function of modulating the intensity of the input light with a number $R_i$ of RF tones (i.e. $R_i$ RF signals at different frequencies), producing an output signal with different spectrum with respect to the input light. Each spectrum shaper is composed of an optical intensity modulator, $R_i$ RF signals that are combined in the electrical domain by an RF combiner, and a bias direct-current (DC) voltage. For each modulator, the bias, the frequency of the $R_i$ RF tones and their respective amplitudes can be independently tuned so as to obtain a number $N_i$ of equalized lines with strongly-suppressed higher order sidebands.

Cascading the spectrum shapers and adjusting the voltage of each RF signal and bias voltage, a total of $N=\Pi_{i=1}^{M} N_i$ equally spaced lines can be generated, being $N_i$ the number of lines obtained by the i-th spectrum shaper, where M is the total of spectrum shapers. The phase of each RF signal should be adjusted independently using a common time base that synchronizes them, so that a locked linear-phase relation between comb lines can be obtained. Note that the combined RF signals are typically connected to the 'RF port' of the intensity modulator; however, in case low frequency RF signals are required (i.e. when low frequency difference $f_R$ is required in order to increase the pulse repetition period), it is also possible to drive the intensity modulator by low-frequency RF tones through the 'bias port' of the modulator.

FIG. 3(a) illustrates a possible exemplary realization of the embodiment described in FIG. 2. The system illustrated in FIG. 3(a), according to a preferred realization of the present invention, includes an external cavity laser (ECL) as the light source and M=2 spectrum shapers. Each spectrum shaper is composed of an intensity modulator (corresponding to a Mach-Zehnder modulator (MZM)) along with RF generators and bias power supplies.

In order to ensure a linear-phase relation between all generated lines RF signals, the two RF generators are synchronized with each other and the phase difference between RF signals is accurately adjusted. For every optical carrier at the modulator input, two symmetrical sidebands are generated at the modulator output. The frequency difference between each sideband and its respective carrier is given by the RF tone frequency.

FIGS. 3(b), 3(c), 3(d), and 3(e) show different possible frequency combs can be obtained by this specific implementation depending on the working regime of the intensity modulators. Every intensity modulator can be in either a carrier-suppressed regime or a carrier-unsuppressed regime. Therefore, with two intensity modulators we have four possible frequency combs.

1) FIG. 3(b) shows a 6-line comb obtained from suppressed-carrier MZM1 and unsuppressed MZM2 so that the RF frequencies satisfy $2f_1=3f_2$.
2) FIG. 3(c) shows a 6-line comb obtained from unsuppressed-carrier MZM1 and suppressed MZM2 so that the RF frequencies satisfy $f_1=4f_2$.
3) FIG. 3(d) shows a 9-line comb obtained from unsuppressed-carrier MZM1 and MZM2 so that the RF frequencies satisfy $f_1=3f_2$.

4) FIG. 3(e) shows a 4-line comb obtained from suppressed-carrier MZM1 and MZM2 so that the RF frequencies satisfy $f_1=2f_2$.

The optical spectrum analyzer and optical sampling oscilloscope are optional and they are essentially used to visualize the output of the invention in the frequency domain and time domain, respectively.

Other combinations of RF signals and modulators are possible to generate flat combs. The frequency of each RF signal, as well as the RF signal amplitude and bias voltage must be carefully modified or chosen in order to generate a comb of equally spaced phase-locked spectral lines with equalized amplitude.

Another embodiment consists in using spectral shapers placed in parallel. Each modulator (for example, an MZM) generates a given number of lines of the comb and the combination leads to the desired comb bandwidth and number of lines. FIG. 4 depicts such an embodiment and system for generating flat and phase locked combs using an optical splitter, spectrum shapers placed in parallel and an optical combiner. Each spectrum shaper i has the function of modulating the intensity of the input light with a number $R_i$ of RF tones (i.e. $R_i$ RF signals at different frequencies). Each spectrum shaper is composed of an optical intensity modulator, $R_i$ RF signals that are combined in the electrical domain by an RF combiner, and a bias direct-current (DC) voltage. For each modulator, the bias, the frequency of the $R_i$ RF tones and their respective amplitudes can be independently tuned so as to obtain a number $N_i$ of equalized lines with strongly-suppressed higher order sidebands.

In this scheme, the input light is first split in M branches, each one composed of a spectrum shaper that generates a given number of lines, which are then combined to form the rectangular-shaped comb with lines having equal amplitude. The total number of lines corresponds to the sum of the number of lines at different frequencies generated by each spectrum shaper. So, with M spectrum shapers in parallel each of which generates spectral lines at $N_i$ different frequencies, the output can be a frequency comb with $N=\Sigma_{i=1}^{M} N_i$ spectral lines. The phase of each RF signal is adjusted independently using a common time base that synchronizes them, so that a locked linear-phase relation between comb lines can be obtained.

A further embodiment concerns combining cascaded and parallel spectrum shapers, as described in FIG. 5. In such a configuration, the system can be implemented with P parallel branches, each one containing a series of $M_i$ cascaded spectral shapers. Thus, the total number of spectrum shapers is $\Sigma_{i=1}^{P} M_i$. Each spectrum shaper modulates the incoming light with $R_{ij}$ RF tones at different frequencies, so that the total number of spectral lines in the comb is given by the sum of lines generated at different frequencies by each series of cascaded spectral shapers for each of the branches.

Sinc-shaped Nyquist pulses possess a rectangular spectrum, enabling data to be encoded in a minimum spectral bandwidth and satisfying by essence the Nyquist criterion of zero inter-symbol interference. This property makes them very attractive for communication systems since data transmission rates can be maximised whilst the bandwidth usage is minimised. However, most of the known pulse shaping methods reported so far have remained rather complex and none has led to ideal sinc pulses. In contrast, the present invention provides a method to produce sinc-shaped Nyquist pulses of very high quality based on the direct synthesization of a rectangular-shaped and phase-locked frequency comb. Advantageously, the method and system of the present invention is highly flexible and can be easily integrated in communication systems, offering a substantial increase in data transmission rates. Furthermore, the high quality and wide tunability of the sinc-shaped pulses produced by the method and system of the present invention can also bring benefits to many other fields, such as microwave photonics, light storage, and all-optical sampling.

In currently deployed optical networks, wavelength division multiplexing (WDM) is used to enhance the carrier capacity of optical fibres. However, since the data rate in optical networks increases by close to 29% per year[1], new approaches are being developed[2]. The bulk of these approaches consists in increasing the spectral efficiency of optical links. Using multilevel modulation formats and polarisation multiplexing, the spectral efficiency can be increased from 0.8 to several bit/s/Hz[3-5]. However, such schemes drastically increase the requirements on electrical signal processing and are typically accompanied by higher energy consumption. To keep pace with the growing demand, a data rate of 1 Tbit/s per channel together with high spectral efficiency has been envisaged for the next decade[6]. Even with parallelisation, these data rates are beyond the limits of current digital signal processing, and the resulting baud rate exceeds the possibilities of current electronic circuits[7]. A possible solution is the combination of several lower rate channels with high spectral efficiency into a Tb/s "superchannel", which can be routed through the existing optical networks as a single entity[8]. Such an aggregation can be achieved in the frequency or time domain[9]. In orthogonal frequency-division multiplexing (OFDM), a superchannel consisting of a set of subcarriers is generated. Each subcarrier exhibits a sinc-shaped spectrum and can therefore be spaced at the baud rate without inter-channel interference. With OFDM, a data rate of 26 Tbit/s and a net spectral efficiency of 5 bit/s/Hz have been demonstrated[10]. Similarly, for Nyquist-transmission, the symbols are carried by Nyquist pulses[11] that overlap in the time domain without inter-symbol interference (ISI). Recently, a 32.5 Tbit/s Nyquist WDM transmission with a net spectral efficiency of 6.4 bit/s/Hz has been shown[12].

Compared to OFDM, Nyquist pulse shaping has several unique advantages as it reduces the receiver complexity[13,14], is less sensitive to fibre nonlinearities[14], requires much lower receiver bandwidths[15], and leads to lower peak-to-average power ratios[16].

A general expression in the time domain for the amplitude waveform of Nyquist pulses is[17,18]:

$$r(t) = \frac{\sin(2\pi t/\tau_p)}{2\pi t/\tau_p} \frac{\cos(2\beta\pi t/\tau_p)}{1-(4\beta t/\tau_p)^2}, \quad (1)$$

where $\tau_p$ is the pulse duration between zero crossings and $\beta$ is known as a roll-off factor[17], which is in the range $0 \le \beta \le 1$. Among the class of Nyquist pulses[11], the sinc-shaped pulse is of particular interest owning to its rectangular spectrum[17] and zero roll-off. This advantageously allows minimising the guard band between optical channels. Theoretically, for a sinc-pulse Nyquist transmission each symbol consists of a time-unlimited sinc-pulse. However, since causality makes it impossible, periodic pulses are typically used in every experimental demonstration of Nyquist-pulse transmission[12-20]. Such transmission systems rely on multiplexing and modulation techniques.

A possible scheme and method is shown in FIG. 6. Nyquist channels can be multiplexed in time domain; this is designated as orthogonal time-division multiplexing (TDM)[18,21,22]. The generated sequence is split into N channels, which are then delayed and modulated to transport the channel corresponding data. This requires N modulators, with N the number of branches or the number of time-domain channels. However, compared to a direct modulation, the baud rate of each modulator is N-times reduced. This drastically relaxes the requirements on modulators and electronics. Additionally, time-domain channels can be multiplexed at different wavelengths; this is designated as Nyquist WDM[8], where pulse can be generated and modulated for each carrier. Since higher-order modulation formats, multiplexing, transmission and demultiplexing of Nyquist pulses have already been shown elsewhere[12-18], the focus of the present invention is placed on the generation of a sinc-pulse shape as ideal as possible.

The temporal and spectral features of sinc-shaped pulses not only bring benefits to optical communications, but also to many other fields. Actually, sinc-shaped pulses correspond to the ideal interpolation function for the perfect restoration of band-limited signals from discrete and noisy data[23]. Hence, sinc pulses can provide substantial performance improvement to optical sampling devices[24]. Furthermore, the spectral features of sinc pulses could enable the implementation of ideal rectangular microwave photonics filters[25-27] with tunable passband profiles, thus also providing interesting possibilities for all-optical signal processing[28], spectroscopy[29] and light storage[30,31].

Several approaches for the generation of Nyquist pulses have been suggested. In refs. 9 and 16 an arbitrary waveform generator was programmed offline to create Nyquist filtering of the baseband signal. This can provide a quite good roll-off factor of β=0.0024[16]. However, this method is restricted by the speed of electronics due to the limited sampling rate and limited processor capacities, whereas the quality of the Nyquist pulses highly depends on the resolution (number of bits) of digital-to-analogue converters[32]. Another possibility is the optical generation of Nyquist pulses[13,18]. These optical sequences can reach much shorter time duration and can thus be multiplexed to an ultrahigh symbol rate. To generate Nyquist pulses, a liquid crystal spatial modulator has been used to shape Gaussian pulses from a mode-locked laser into raised-cosine Nyquist pulses. It is also possible to generate Nyquist pulses using fibre optical parametric amplification, pumped by parabolic pulses, and a phase modulator to compensate the pump-induced chirp[20]. However, compared to electrical pulse shaping, optical Nyquist pulse generation produces much higher roll-off factors[33], such as β=0.5[13,18]; therefore, multiplexing using this kind of pulses results in a non-optimal use of bandwidth. Furthermore, most of the reported methods use complex and costly equipment.

The present invention concerns a method to generate a sequence of very high quality Nyquist pulses with an almost ideal rectangular spectrum (β~0). The method is based on the direct synthesization of a flat phase-locked frequency comb with high suppression of out-of-band components. It is theoretically demonstrated and experimentally confirmed that this comb corresponds to a periodic sequence of time-unlimited sinc pulses. The wide tunability of the method, using a proof-of-concept experiment based on two cascaded Mach-Zehnder modulators (MZM), is demonstrated over 4 frequency decades. Experimental results also verify the remarkable high quality of the generated pulses, exhibiting in all cases zero roll-off, minimum spectral broadening when modulated, and less than 1% deviation with respect to the ideal sinc shape. These pulses simultaneously show a minimum ISI and a maximum spectral efficiency, making them an attractive solution for high-capacity TDM-WDM systems.

Basic Concepts

Considering that due to physical limitations the ideal sinc pulse with perfect rectangular optical spectrum has not been demonstrated so far, a different approach for sinc-shaped Nyquist pulse generation is proposed by this invention. The technique is a straightforward way to realise sinc-shaped Nyquist pulses in the optical domain, overcoming the limitations imposed by the speed of electronics.

The principle of the method is based on the time-frequency duality described by Fourier analysis, as shown in FIGS. 7(a)-7(d). A sinc pulse can be represented by a rectangular spectrum in the Fourier domain (see FIGS. 7(a)-7(b)), while the frequency content of a train of sinc pulses corresponds to a flat comb with equally-spaced components within the bandwidth defined by the single pulse spectrum (see FIGS. 7(c)-7(d)). Therefore, instead of shaping a single sinc pulse, the approach of the present invention produces a sequence of sinc pulses directly from the generation of an optical frequency comb having uniformly-spaced components with narrow linewidth, equal amplitude, and linear locked phase, together with strong outer-band suppression[34]. As demonstrated by this invention, the pulse sequence obtained from this rectangular frequency comb is strictly identical to the summation of individual time-unlimited sinc pulses, and intrinsically satisfies the zero-ISI Nyquist criterion, similarly to the ideal single sinc-shaped pulse. As described in FIGS. 7(a)-7(d), the frequency spacing Δf between adjacent spectral lines determines the pulse repetition period T=1/Δf, and the rectangular bandwidth NΔf (N being the number of lines) defines the zero-crossing pulse duration $\tau_p$=2/(NΔf). Thus, pulse width and repetition rate can be changed by simply tuning the frequency comb parameters. This feature offers a highly flexible and simple way to adjust the bit rate and bandwidth allocation in an optical network according to actual requirements[35,36], or to change the parameters of optical sampling devices[24] whenever required.

Theory

The Nyquist criterion for a pulse y(t) satisfying zero inter-symbol interference implies that, for a particular sampling period $\tau=\tau_p/2$, y(nτ) is 0 for any non-zero integer n, while y(0)≠0. This means that when the signal is periodically sampled with a period r, a non-zero value is obtained only at the time origin[11]. For instance the sinc function defined as $$sinc(t) = \frac{\sin(\pi t)}{\pi t}$$

is a Nyquist pulse possessing a rectangular spectrum and is therefore unlimited in time. As a consequence of causality, the sinc function is therefore only a theoretical construct[17].

In this invention, instead of generating a single time-unlimited sinc pulse, a method and system obtain a sequence of sinc pulses based on the generation of a flat frequency comb with close-to-ideal rectangular spectrum. Here it is shown that the time-domain representation of the generated comb corresponds to an unlimited ISI-free summation of sinc-shaped Nyquist pulses. However, in complete contrast to the single sinc pulse, the pulse sequence can be easily generated from a rectangular frequency comb. Here, the mathematical demonstration is presented for an odd number of frequency lines; however, the derivation for an even number can be straightforwardly obtained following the same procedure.

The time-domain representation of the optical field of a frequency comb with N lines, having the same amplitude $E_0$/N and frequency spacing Δf around the central frequency $f_0$, can be expressed as:

$$E(t) = \frac{E_0}{N} \sum_{n=-\frac{N-1}{2}}^{\frac{N-1}{2}} e^{2i\pi(f_0 + n\Delta f)t + i\phi} = \tag{2}$$

$$\frac{E_0}{N} e^{2i\pi f_0 t + i\phi} \sum_{n=-\frac{N-1}{2}}^{\frac{N-1}{2}} e^{2i\pi n\Delta f t} = \frac{E_0}{N} e^{-2i\pi f_0 t + i\phi}$$

$$\frac{e^{i\pi\Delta f(N+1)t} - e^{-i\pi\Delta f(N-1)t}}{e^{2i\pi\Delta f t} - 1} = E_0 \frac{\sin(\pi N\Delta f t)}{N\sin(\pi\Delta f t)} e^{2i\pi f_0 t + i\phi}.$$

For the sake of simplicity it is assumed that all frequency components have the same phase φ. Strictly speaking, it is sufficient that the phases of all frequency components are locked showing a linear dependence on frequency, however this linear dependence can be nullified by properly choosing the time origin without loss of generality. Equal phases will be assumed hereafter to simplify the notation.

From Eq. (2) the normalised envelope of the optical field is calculated to be $$\frac{\sin(\pi N\Delta f t)}{N\sin(\pi\Delta f t)},$$

denominated hereafter periodic sinc function. In order to demonstrate that this envelope actually corresponds to a train of sinc-shaped Nyquist pulses, it is convenient to start from its frequency-domain representation. According to Eq. (2) and using the Fourier transform, it follows:

$$F\left\{\frac{\sin(\pi N\Delta f t)}{\sin(\pi\Delta f t)}\right\} = F\left\{\sum_{n=-\frac{N-1}{2}}^{\frac{N-1}{2}} e^{2i\pi n\Delta f t}\right\} = \sum_{n=-\frac{N-1}{2}}^{\frac{N-1}{2}} \delta(f - n\Delta f). \tag{3}$$

Introducing the rectangular function $$\Pi\left(\frac{n}{N}\right)$$

that is 1 for all integers n where $$|n| \leq \frac{N-1}{2}$$

and 0 elsewhere, the above equation can be written as:

$$\sum_{n=-\frac{N-1}{2}}^{\frac{N-1}{2}} \delta(f - n\Delta f) = \tag{4}$$

$$\sum_{n=-\infty}^{+\infty} \Pi\left(\frac{n}{N}\right) \delta(f - n\Delta f) = \Pi\left(\frac{f}{N\Delta f}\right) \sum_{n=-\infty}^{+\infty} \delta(f - n\Delta f),$$

where the rectangular spectrum $$\Pi\left(\frac{f}{N\Delta f}\right),$$

covering a bandwidth NΔf, is represented in the time domain by the sinc pulse NΔfsinc(NΔft). The temporal dependence of the above expression can then be obtained by taking its inverse Fourier transform and using the Poisson summation formula[37]:

$$F^{-1}\left\{\Pi\left(\frac{f}{N\Delta f}\right)\sum_{n=-\infty}^{+\infty}\delta(f-n\Delta f)\right\} = N\mathrm{sinc}(N\Delta ft) \otimes \sum_{n=-\infty}^{+\infty}\delta\left(t-\frac{n}{\Delta f}\right), \tag{5}$$

where ⊗ denotes the convolution operation. Thus, it follows for the right-hand side of Eq. (5):

$$N\mathrm{sinc}(N\Delta ft) \otimes \sum_{n=-\infty}^{+\infty} \delta\left(t - n\frac{n}{\Delta f}\right) = \sum_{n=-\infty}^{+\infty} N\mathrm{sinc}\left(N\Delta f\left(t - \frac{n}{\Delta f}\right)\right). \tag{6}$$

Therefore, it can be written that:

$$\frac{\sin(\pi N\Delta ft)}{N\sin(\pi\Delta ft)} = \sum_{n=-\infty}^{+\infty} \mathrm{sinc}\left(N\Delta f\left(t - \frac{n}{\Delta f}\right)\right). \tag{7}$$

Similarly, for an even number of spectral lines, the envelope of the optical field can be expressed as a train of sinc pulses through the following equation:

$$\frac{\sin(\pi N\Delta ft)}{N\sin(\pi\Delta ft)} = \sum_{n=-\infty}^{+\infty} (-1)^n \mathrm{sinc}\left(N\Delta f\left(t - \frac{n}{\Delta f}\right)\right) \tag{8}$$

where the factor $(-1)^n$ comes from the absence of a spectral line at the central frequency of the comb; this eliminates the DC component in the optical field envelope.

Comparing Eqs. (7) and (8), the following general expression for the normalised envelope of the optical field resulting from a flat frequency comb is obtained, independent of the parity of N:

$$\frac{\sin(\pi N\Delta ft)}{N\sin(\pi\Delta ft)} = \sum_{n=-\infty}^{+\infty} (-1)^{(N-1)n} \mathrm{sinc}\left(N\Delta f\left(t - \frac{n}{\Delta f}\right)\right). \tag{9}$$

The difference in the periodic sinc function $$x(t) = \frac{\sin(\pi N\Delta ft)}{N\sin(\pi\Delta ft)}$$

for even and odd N can be figured out easily. As depicted in FIG. 8(a), all sinc pulses of the pulse train for odd N show the same phase, so that $x(t_s)=1$ at every sampling instant $$t_s = \frac{n}{\Delta f}$$

for all integer n. For even N, $x(t_s)=(-1)^n$, so that each pulse envelope is of opposite sign with its preceding and following pulse, as shown in FIG. 8(b). Aside this difference, the optical intensity measured by a photo-detector is the same in both cases, and is given by:

$$I(t) = |E(t)|^2 = E_0^2 \frac{\sin^2(\pi N \Delta f t)}{N^2 \sin^2(\pi \Delta f t)}. \quad (10)$$

Consequently, it is proven that the field envelope of the time-domain representation of a frequency comb of N identical and equally-spaced lines corresponds to an infinite summation of sinc-shaped Nyquist pulses with period $$\frac{1}{\Delta f}$$

and zero-crossing pulse width $$\frac{2}{N\Delta f}.$$

Thus, considering that the pulse repetition period $$T = \frac{1}{\Delta f}$$

is a multiple of the time interval $$\tau = \frac{1}{N\Delta f},$$

the resulting time-domain envelope x(t) satisfies the following condition for any integer m:

$$x(m\tau) = \begin{cases} (-1)^{(N-1)m/N} & m = \ldots, -2N, -N, 0, N, 2N, \ldots \\ 0 & \text{otherwise} \end{cases} \quad (11)$$

Thus, the sequence of sinc pulses resulting from a locked-phase, rectangular frequency comb satisfies the Nyquist criterion for free-ISI within every pulse repetition period T. This condition is automatically and intrinsically satisfied for any flat frequency comb since the number of lines N is an integer by definition. Therefore, the generated sinc pulse sequence can be multiplexed in time without inter-symbol interference.

Proof-of-Concept Experiment

There are several different approaches for the generation of a frequency comb. For instance, they can be obtained from conventional femtosecond lasers, such as Er-fiber[38,39], Yb-fiber[40] and Ti: sapphire mode-locked lasers, or from a continuous wave optical source exploiting Kerr-nonlinearities in an optical resonator[42-45], or employing a combination of strong intensity and phase modulation[46-48] together to chirped Bragg gratings[49], dispersive medium[50] or highly non-linear fibers[51-53]. However, every comb does not necessarily result in a sequence of Nyquist pulses, since a sinc pulse sequence can only be obtained under specific conditions, requiring that the produced comb has to show line amplitudes as equal as possible, linear phase dependence through all lines, and a strong suppression of out-of-band lines. Thus, although flat frequency combs can be obtained using different methods, as for instance through phase modulation[48,50], the phase difference between lines and the existing out-of-band components make phase modulators improper for clean generation of sinc-shaped pulses.

In general, a close-to-ideal rectangular-shaped optical frequency comb can be produced using various implementations; for instance, a non-optimal frequency comb[38-53] can be used in combination with a spectral line-by-line manipulation of the optical Fourier components[54,55] to control the amplitude and phase of each spectral line. It turns out that the complexity of this kind of pulse shapers significantly increases with the number of spectral lines and in general pulse shapers are unable to manipulate a frequency comb having spectrally spaced lines below 1 GHz[54,55].

Here a simple proof-of-concept experimental setup, shown in FIG. 3(a), is described. This uses two cascaded lithium niobate (LiNbO$_3$) Mach Zehnder modulators (MZM) with a specific adjustment of the bias and modulation voltages (see 'Methods' section below for further details). An optical spectrum analyser (OSA) with a spectral resolution of 0.01 nm is used to measure the generated frequency combs, while an optical sampling oscilloscope with 500 GHz bandwidth is employed to measure the time-domain pulse train waveforms.

While the first modulator, driven by an RF signal at a frequency $f_1$ is adjusted to generate three seeding spectral components, the second MZM re-modulates those lines using an RF signal at $f_2$. Thus, for instance, to generate N=9 spectral lines, the condition $f_1=3f_2$ or $f_2=3f_1$ has to be satisfied without any carrier suppression, resulting in a frequency spacing between the lines of $\Delta f=\min(f_1, f_2)$. However, to generate a comb with N=6 lines, the carrier of one of the modulators must be suppressed leading to two possible configurations, as illustrated in FIGS. 3(b)-(c).

If the optical carrier is suppressed in the first modulator (see FIG. 3(b)), the RF frequencies must satisfy the condition $2f_1=3f_2$, giving a line spacing $\Delta f=f_2$. On the other hand, if the carrier is suppressed in the second modulator (see FIG. 3(c)), the relation between modulating frequencies has to be $f_1=4f_2$, resulting in a frequency spacing $\Delta f=2f_2$.

A high-quality rectangular-shaped frequency comb can be obtained by tuning the DC bias $V_B$ and the RF voltage amplitude $v_s$ of each modulator following the description presented in further detail in the Methods section below. To ensure that the three components generated by each modulator are in phase, $V_B$ and $v_s$ might take either positive or negative values. Moreover, in order to obtain spectral lines with similar phase using two cascaded MZMs, the phase difference between the modulating RF signals has to be finely adjusted to compensate propagation delays in optical and electrical links, thus leading to almost perfectly shaped symmetric pulses.

On the other hand, in order to confine the sinc-pulse sequence into the Nyquist bandwidth, a low modulating voltage $v_s$ must be used to strongly suppress the out-of-band components. In particular, the RF driving voltage $v_s$ of both modulators was adjusted to remain below ~0.3614$V_\pi$ (where $V_\pi$ is the half-wave voltage of the MZM), securing a suppression of more than 27 dB for the out-of-band components.

Note that this level of confinement is only possible thanks to the two degrees of freedom provided by intensity modulators, since both operating bias point and modulating voltages can be adjusted.

High-Quality and Widely-Tunable Sinc-Shaped Nyquist Pulses

The quality of the pulses and the flexibility of the method of the present invention have been experimentally verified by changing the modulating signal frequencies $f_1$ and $f_2$ in a wide spectral range, and comparing measurements with the theoretical expectations. This way different frequency combs with N=9 spectral components have been generated with a frequency spacing $\Delta f$ spanning over many decades (between 10 MHz and 10 GHz).

In FIGS. 9(a)-9(d) the measured sinc pulses (black straight lines) are compared with the theoretical ones (dashed lines) described by Eq. (10). Measured and theoretical curves are normalised in all figures. Temporal waveforms have been acquired with a sampling interval of 0.2 ps for the case of $\Delta f=10$ GHz; this interval has been proportionally increased for longer pulse widths. In particular, FIG. 9(a) shows the case of modulating frequencies $f_1=30$ MHz and $f_2=\Delta f=10$ MHz, resulting in sinc-shaped Nyquist pulses with zero-crossing pulse duration of $\tau_p=22.22$ ns, full-width at half-maximum (FWHM) duration of 9.8 ns, and a repetition period of T=100 ns. In FIGS. 9(b)-(d), the modulating frequencies have been sequentially increased by one order of magnitude. It is observed that the generated pulse sequences coincide very well with the ideal ones over 4 frequency decades, showing a root-mean-square (RMS) error below 1% for all cases. In addition, it was verified that the spectrum for all these conditions resulted to be close to the ideal rectangular case, as it will be detailed below.

The dashed line box in FIG. 10(a) shows an ideal rectangular spectrum, which corresponds to a single sinc pulse with a FWHM duration of 9.8 ps, as the one reported in FIG. 9(d). The solid-line curve represents the measured flat phase-locked comb in such a case, showing more than 27 dB suppression of the higher-order sidebands and a power difference between components lower than 0.2 dB. The pulse repetition period, corresponding to T=100 ps, is clearly observed in FIG. 10(b).

Then, the pulse duration and the repetition rate have been easily changed by modifying the spectral characteristics of the generated frequency comb. For instance, if the second modulator is driven by two RF signals combined in the electrical domain, each of the 3 frequency components resulting from the first modulator are modulated to create up to 5 spectral lines each (four sidebands and carrier). This way, N=10 spectral lines separated by $\Delta f=10$ GHz have been generated by modulating the first MZM at $f_1=25$ GHz in carrier-suppression mode and by driving the second MZM with two RF signals at $f_{21}=10$ GHz and $f_{22}=20$ GHz. The measured optical spectrum, showing a bandwidth of 100 GHz and spurious components suppressed by more than 26 dB, is illustrated in FIG. 10(c). Note that in this case the first modulator is working in carrier-suppression mode; and therefore, the main spurious lines observed in the spectrum result predominantly from the limited extinction ratio of the modulators (in this case, 40 GHz MZMs with typical extinction ratio of about 23-25 dB), which makes a perfect carrier suppression impossible. Higher suppression of such spurious components can be obtained using modulators with better extinction ratio (note that MZMs with 40 dB extinction ratio are commercially available at 10 GHz bandwidth). Since the frequency spacing among components is the same as in the previous case, i.e. $\Delta f=10$ GHz, the pulse repetition period T=100 ps has not changed; however the zero-crossing pulse duration has been reduced down to $\tau_p=20$ ps (FWHM duration of 8.9 ps), as shown in FIG. 10(d).

By rearranging the modulating frequencies to $f_1=30$ GHz, $f_{21}=6$ GHz and $f_{22}=12$ GHz, and by adjusting the bias point of the first modulator (see Eq. (14) in the Methods section below), so that the carrier is not suppressed in this case, a frequency comb expanding over a bandwidth of 90 GHz has been obtained, with N=15 spectral components, a frequency spacing L f=6 GHz, and more than 27 dB suppression of higher-order sidebands, as reported in FIG. 10(e). The measured sinc pulse has a zero-crossing duration of $\tau_p=22$ ps (FWHM duration of 9.8 ps) and a repetition period of T=166.67 ps, as depicted in FIG. 10(f).

Finally, the bandwidth of the comb has been broadened exploiting the second-order sidebands of the modulators. As described in the Methods section, this can be achieved by using a proper DC bias voltage that suppresses simultaneously all odd-order sidebands; but it also requires a modulating amplitude of $v_s \approx 1.52 V_\pi$ for a complete carrier suppression. For the MZMs used here, this optimal modulating amplitude corresponds to an RF power of about 1 W. Using standard drivers, it was not possible to reach such an RF power level and supress completely the carrier, although a strong suppression of unwanted sidebands could be reached by a simple DC bias adjustment. As a workaround, two narrowband fibre Bragg gratings (FBGs, 3 GHz bandwidth each), centred at the carrier wavelength, have been placed at the output of the first MZM, providing more than 40 dB carrier rejection (an optical isolator has also been inserted between the FBGs to avoid multiple reflections). Thus, driving the first MZM at $f_1=19.5$ GHz, two frequency components (second-order sidebands) are obtained with a spectral separation of 78 GHz. Then, the second MZM is driven at $f_2=26$ GHz in order to obtain a comb expanding over a bandwidth of 156 GHz, with N=6 spectral components equally spaced by $\Delta f=26$ GHz. The obtained comb is shown in FIG. 10(g), presenting a 21 dB suppression of unwanted components. In the time domain, the measured sinc pulse has a zero-crossing duration of $\tau_p=12.8$ ps (FWHM duration of 5.75 ps) and a repetition period of T=38.46 ps, as shown in FIG. 10(h).

Note that the apparent line broadening shown for all frequency components in FIGS. 10(a)-10(h) results from the limited resolution of the optical spectrum analyser, which is 0.01 nm. The real linewidth is essentially given by the laser linewidth, which is in the kHz range for the used external cavity laser, i.e. more than 7 orders of magnitude lower than the pulse rectangular bandwidth.

FIG. 11(a) shows a colour-grade plot of the measured Nyquist pulses for the case reported in FIG. 10(a)-(b), demonstrating that even the simple setup of FIG. 3(a) can generate very stable and high-quality sinc-shaped pulse sequences with very low jitter (82 fs, equivalent to 0.82% of the FWHM) and very high signal-to-noise ratio (SNR>40 dB, above the oscilloscope SNR measurement capacity). Jitter and SNR for all other measured conditions exhibit similar values with respect to the ones reported here. The quality of the measured pulses is also analysed by comparing them with the intensity derived from the analytical expression for Nyquist pulses as a function of the roll-off factor β, as described in Eq. (1).

FIG. 11(b) shows the RMS error between the measured pulses and the theoretical intensity waveforms for roll-off factors between 0 and 1. It can be observed that the minimum RMS error is reached with a factor β=0, indicating that the obtained pulses coincide very well with the ideal sinc pulse shape with an RMS error of 0.98%. All other measurements reported in FIGS. 9 and 10 also present the same quality as the one described here. When this factor β=0 is compared with the roll-off obtained by other optical pulse shaping methods[13,18,20,21] (reporting β=0.4 in the best case[21]), a significant improvement in the quality of the pulses generated here can be easily concluded. This is also evident by simply comparing the spectral and time-domain measurements shown in FIGS. 9(a)-9(d) and FIGS. 10(a)-10(h) with results reported in refs. 13, 18, 20 and 21.

In conclusion, a method and system to produce sinc-shaped Nyquist pulses of unprecedented high-quality has been described and demonstrated based on the optical generation of a phase-locked frequency comb with a rectangular spectral shape. The system and method advantageously offers a high flexibility to modify the pulse parameters thanks to the possibility to easily change the bandwidth of the comb, the number of spectral lines, and their frequency separation. Due to its conceptual simplicity many experimental variants can be implemented using similar approaches.

In the context of telecommunication systems, the generated sequence of sinc-shaped pulses can be multiplexed either in the time or frequency domain following the standard approaches for orthogonal TDM[18] or Nyquist WDM[8] transmission schemes. To implement an almost ideal Nyquist transmission system, the zero ISI criterion has to be satisfied by the modulated channels as well.

However, it is important to mention that the nearly ideal rectangular spectra reported in FIGS. 10(a)-10(h) will no longer be obtained if pulses are modulated with data. Since a modulation in time domain corresponds to a convolution in the frequency domain, the spectrum of the modulated sinc-shaped pulses is given by the convolution of the frequency comb and the frequency representation of the modulating signal. Assuming an ideal rectangular modulation window equal to the pulse repetition period T=1/Δf, the frequency comb will be convolved with a sinc function in the frequency domain[9] having zero crossings at n·1/T=n·Δf, with n being a non-zero integer number. Thus, the frequency components of the comb coincide with the zero crossings of the modulating signal, which also holds for neighbouring WDM channels (assuming zero guard band).

FIGS. 12(a) and 12(c) show the simulated spectra resulting from modulating ideal sinc pulses with on-off keying (OOK) and binary phase-shift keying (BPSK) modulation formats, respectively. It is possible to observe the expected spectral broadening resulting from the modulation. As can be seen from the dashed lines, the spectral zero crossings outside of the Nyquist bandwidth fall exactly in the comb lines of the adjacent WDM channels, indicating that no guard band between the channels is necessary. Thus, this results in an optimal exploitation of the bandwidth. Both simulated conditions have been experimentally verified by modulating the generated sequence of sinc-shaped pulses using a pseudo-random binary sequence (PRBS) with a length of $2^{31}-1$. FIGS. 12(b) and 12(d) compare the spectral measurements (for OOK and BPSK modulation, respectively) with the spectrum resulting from the simulations convolved with the spectral response of the OSA (a resolution filter with 0.01 nm bandwidth). It is clearly observed that when the generated sinc pulses are modulated, the spectral broadening matches very well the expected behaviour described by the simulations. The small differences between simulation and experiment come from the non-ideal rectangular modulation window and additional convolutions between the very small out-of-band comb lines and the modulation spectrum.

Measurements and simulations indicate that a spectral broadening, so called excess bandwidth[17], of about 11% results from modulating the generated sinc pulses (considering only the power within the main spectral lobe, confining about 99% of the power). However, different from other optical pulse shaping techniques[13,18,21], it is important to notice that this excess bandwidth, expressed as a percentage of the Nyquist frequency, does not depend on the roll-off factor of the unmodulated pulses since this factor is practically zero in the present case. Instead, the broadening is here only given by the ratio between the pulse repetition rate (defining the modulating window) and the pulse width (defining the Nyquist bandwidth)[9,17], thus being proportional to Δf/(NΔf)=1/N (where N is the number of lines in the comb). It is therefore remarkable that even with only N=9 spectral lines, the excess bandwidth resulting from modulation, equal to 1/N=0.11 and here obtained with a simple proof-of-concept setup, is significantly lower than the one obtained by other optical pulse shaping methods[13,18,21]. Such methods actually report a roll-off factor between β=0.4[21] and β=0.5[13,18] for unmodulated pulses, which is already higher than the factor 0.11 here obtained after modulation. Additionally, due to the fixed relation between the symbol duration of the modulating data and the pulse width, this broadening does not require a guard band between WDM channels, as already discussed.

It is worth mentioning that the spectral broadening obtained here can be significantly reduced if the number of lines in the frequency comb is increased[9,32]. This results in an extension of the modulating window (i.e. a narrower modulating spectrum) and/or in a broadening of the Nyquist bandwidth. Thus, for instance, if the pulses in FIG. 10(f) are modulated, the excess bandwidth would be reduced down to 6.7%. This way, and due to the zero roll-off of the unmodulated pulses, the spectrum of the modulated periodic sinc pulses can expectedly get closer to an ideal rectangular shape[9,32].

Finally, in a more general context, it is expected that the use of nearly ideal optical sinc-shaped pulses not only would increase the transmission data rates in existing optical networks, but can also provide great benefits for optical spectroscopy, all-optical sampling devices and photonic analogue-to-digital converters, among other potential applications.

Methods

Rectangular-Shaped Frequency Comb Generation: Consider M intensity modulators, so that each of them can generate two or three equal-intensity, phase-locked main spectral lines by controlling its DC bias voltage and RF signal amplitude. The impact of the higher order sidebands will be addressed in a second stage. If a subset of m modulators each creates 3 spectral lines (carrier and two first-order sidebands) and the remaining M−m modulators each produce 2 lines (two first-order sidebands with suppressed carrier), a comb with $N=2^{M-m}3^m$ equally spaced spectral lines, with the same amplitude and phase, can be generated by cascading the modulators and by properly adjusting the applied bias voltage and modulating amplitude, and by appropriately selecting their modulation frequency.

In order to properly adjust the DC bias and modulating RF voltage in each MZM, the expression for the output field from each modulator has to be analysed. If the DC bias and the RF signal voltages applied to a single modulator are $V_B$ and $v_s \cos(\omega_s t)$, respectively, its normalised output optical field is given by the expression[48,56]:

$$E(t) = \sum_{k=-\infty}^{+\infty} (-1)^k \left\{ \cos\left(\frac{\pi\epsilon}{2}\right) J_{2k}\left(\frac{\pi\alpha}{2}\right) \cos(\omega_0 t + 2k\omega_s t) + \right. \quad (12)$$

-continued
$$\sin\left(\frac{\pi\epsilon}{2}\right)J_{2k-1}\left(\frac{\pi\alpha}{2}\right)\cos(\omega_0 t + (2k-1)\omega_s t)\},$$

where $J_k$ is the Bessel function of the first kind and order k, $\in = V_B/V_\pi$, and $\alpha = v_s/V_\pi$, in which $V_\pi$ is the half-wave voltage of the modulator. Note that according to Eq. (12) the amplitude of the carrier, first-order sidebands and higher-order sidebands can be adjusted by a proper tuning of the RF driving voltage $\alpha$ and the DC bias $\in$. The primary objective is to equalise the amplitudes of the carrier and first-order sidebands, and the condition to realise it can be found out from the expression of the output field reduced to these 3 spectral components:

$$E(t) = \cos\left(\frac{\pi\epsilon}{2}\right)J_0\left(\frac{\pi\alpha}{2}\right)\cos(\omega_0 t) - \qquad (13)$$
$$\sin\left(\frac{\pi\epsilon}{2}\right)J_1\left(\frac{\pi\alpha}{2}\right)\{\cos((\omega_0 - \omega_s)t) + \cos((\omega_0 + \omega_s)t)\}.$$

It is important to notice that by using intensity modulators two degrees of freedom, i.e. bias voltage $V_B$ and modulating amplitude $v_s$, can be used to equalise the amplitude of the spectral lines having a linear locked-phase difference, and to achieve a simultaneous suppression of the higher-order sidebands. This issue makes a significant difference with respect to the use of phase modulators[46-51], where only the modulating voltage can be adjusted, making it impossible to obtain spectral components with the same amplitude and uniform locked phase.

FIG. 13(a) shows a contour plot representing the amplitude difference between the first-order sidebands and the carrier (i.e. $-J_1(\pi\alpha/2)\sin(\pi\in/2) - J_0(\pi\alpha/2)\cos(\pi\in/2)$) as a function of the normalised voltages $\alpha$ and $\in$. The figure indicates that there are many combinations of $\alpha$ and $\in$ (represented by the thick solid lines at zero level in the contour plot) that equalise the amplitudes of the carrier and the first-order sidebands. Actually, as depicted in FIG. 13(a), the relation between the optimum bias voltage $V_B$ and the driving RF signal amplitude $v_s$ that fulfils this condition is a periodic function, which can be simply obtained from Eq. (13):

$$V_B = \frac{2V_\pi}{\pi}\tan^{-1}\left\{-\frac{J_0\left(\frac{\pi v_s}{2V_\pi}\right)}{J_1\left(\frac{\pi v_s}{2V_\pi}\right)}\right\}. \qquad (14)$$

Although all valid combinations of $V_B$ and $v_s$ given by Eq. (14) and graphed in FIG. 13(a) provide equalised amplitudes for the three frequency components (two first-order sidebands and carrier), their absolute amplitude can vary considerably. Moreover, phase and amplitude of the higher-order sidebands can also be adjusted by changing the operating bias point and the modulating RF voltage amplitude. FIG. 13(b) shows the amplitude of the three lower-order sidebands as a function of the normalised RF driving voltage $\alpha$, when the optimum bias is set according to Eq. (14). It can be observed that a high amplitude of the 1st order sidebands (equal to the carrier amplitude) together with a low amplitude of higher-order sidebands is only possible if the normalised RF voltage $\alpha$ is set to be lower than 0.8. Other voltage conditions result in lower suppression of the higher-order sidebands, leading to a frequency comb with badly-equalised frequency components.

It must be pointed out that the higher-order sidebands have to be strongly suppressed in order to confine the sinc-pulse sequence into the Nyquist bandwidth. FIG. 13(c) shows the power level of the three higher-order sidebands in dB scale versus the normalised RF voltage, when the bias point is set at its optimum value according to Eq. (14) (power levels in the figure have been normalised to the maximum power of the equalised first-order sidebands). The figure points out that, as previously mentioned, strong suppression of the higher-order sidebands can only be achieved by using a low RF signal amplitude. Although only the three lower order sidebands are analysed here, higher-order sidebands are expected to have much reduced power levels due to the lower amplitude of the higher-order Bessel functions $J_k$ in this driving voltage range. This can be readily justified as a result from the asymptotic form of the Bessel function $J_k(x) \sim x^k$ for small argument x.

According to FIG. 13(c), the maximum power of the carrier and the 1st-order sidebands can be reached using a driving voltage $v_s = 0.8V_\pi$. This condition offers a 15 dB suppression of the second-order sidebands (see dashed line in the figure). However, stronger higher-order sideband suppression can be achieved by a slight reduction of the driving voltage, which also leads to a small power reduction of carrier and 1st-order sidebands. Thus, for instance using a modulating voltage $v_s = 0.32V_\pi$, a higher-order sideband suppression of more than 30 dB can be achieved with a power reduction of 4.5 dB on the carrier and the first-order sidebands with respect to the maximum reachable power level. Thus, arbitrary out-of-band suppression can be obtained using lower RF voltages, while the power reduction of carrier and first-order sidebands can be easily compensated by optical amplification.

In order to implement the proposed idea, an exemplary proof-of-concept setup is described based on two cascaded MZM, driven by independent RF generators; however, there are many ways to extend and improve the proposed setup. Instead of a second generator, a frequency tripler and a phase shifter can be used to drive both modulators. In addition, the number of frequency lines generated by each modulator can be increased combining two or even more RF signals in the electrical domain. In this way, the setup can even be compacted to operate using a single MZM.

Furthermore, shorter pulses can be generated with higher bandwidth modulators, or by the exploitation of the second-order sidebands[48,56] and the simultaneous suppression of the out-of-phase components. According to Eq. (12) all odd-order sidebands can be simultaneously suppressed using a bias voltage $V_B = \in V_\pi$, being $\in$ an even number. Under this condition, only the carrier and even-order sidebands could exit the modulator. While higher-order sidebands are expected to be very low, a strong carrier can still exist. Unfortunately the carrier component is out-of-phase with respect to the second-order sidebands, and therefore it needs to be conveniently suppressed. This suppression can be achieved with a proper RF modulating amplitude, so that the Bessel function of zero order in Eq. (12) vanishes. This optimal condition is given by a driving voltage $v_s \approx 1.52V_\pi$.

FIG. 13(c) points out that in such an optimal operating point the second-order sidebands can be exploited together with a high suppression of the carrier and odd-order sidebands. This would lead to a broader frequency comb, and hence, to shorter sinc-shaped Nyquist pulses. The main practical limitation for this scheme is given by the possibility that the required driving voltage can exceed the maximum RF power allowed by the MZM, and therefore modulators with reduced $V_\pi$ could be more suitable for this purpose.

The described technique produces sinc-shaped Nyquist pulse sequences or substantially sinc-shaped Nyquist pulse sequences of very high quality; however, slight deviations from the ideal sinc shape can be expected in the implementation due to some practical limitations, such as the laser linewidth or the chirp induced by the modulators, leading to small phase differences among the comb spectral components. Possible improvements can be obtained using narrower linewidth optical sources, such as Brillouin lasers with linewidth in the Hz range[57], or employing optimised x-cut chirp-free intensity modulators[58].

Having described now the preferred embodiments of this invention, it will be apparent to one of skill in the art that other embodiments incorporating its concept may be used. This invention should not be limited to the disclosed embodiments, but rather should be limited only by the scope of the appended claims.

REFERENCES

[1] Cisco Visual Networking Index: Forecast and Methodology, 2011-2016 (2013). (http://www.cisco.com/en/US/solutions/collateral/ns341/ns525/ns537/ns705/ns827/white_paper_c11-481360.pdf)

[2] Richardson, D. J. Filling the light pipe. *Science* 330, 327-328 (2010).

[3] Essiambre, R.-J., Foschini, G., Winzer, P. J., & Kramer, G. Capacity limits of fiber-optic communication systems. *Proc. OFC* 2009, OThL1 (2009).

[4] Essiambre, R. J., Foschini, G. J., Kramer, G. & Winzer, P. J. Capacity limits of information transport in fiber-optic networks. *Phys. Rev. Lett.* 101, 163901 (2008).

[5] Essiambre, R. J., Kramer, G., Winzer, P. J., Foschini, G. J., & Goebel, B. Capacity limits of optical fiber networks. *J. Lightw. Technol.* 28, 662-701 (2010).

[6] Desurvire E. Capacity demand and technology challenges for lightwave systems in the next two decades. *J. Lightw. Technol.* 24, 4697-4710 (2006).

[7] Freund R. et al. Single and multi carrier techniques to build up Tb/s per channel transmission systems. *Proc. ICTON*, TuD1.4 (2010).

[8] Bosco, G., Curri, V., Carona, A., Poggiolini, P., & Forghieri, F. On the Performance of Nyquist-WDM terabit superchannels based on PM-BPSK, PM-QPSK, PM-8QAM or PM-16QAM subcarriers. *J. Lightw. Technol.* 29, 53-61 (2011).

[9] Schmogrow, R. et al. Real-time Nyquist pulse generation beyond 100 Gbit/s and its relation to OFDM. *Opt. Express* 20, 317-337 (2012).

[10] Hillerkuss, D. et al. 26 Tbit/s line-rate super-channel transmission utilizing all-optical fast Fourier transform processing. *Nat. Photonics* 5, 364-371 (2011).

[11] Nyquist, H. Certain topics in telegraph transmission theory. *Trans. Am. Inst. Electr. Eng.* 47, 617-644 (1928).

[12] Hillerkuss, D. et al. Single-Laser 32.5 Tbit/s Nyquist WDM Transmission. *J. Opt. Comm. Netw.* 4, 715-723 (2012).

[13] Hirooka, T., Ruan, P., Guan, P., & Nakazawa, M. Highly dispersion-tolerant 160 Gbaud optical Nyquist pulse TDM transmission over 525 km. *Opt. Express* 20, 15001-15007 (2012).

[14] Hirooka, T., & Nakazawa, M. Linear and nonlinear propagation of optical Nyquist pulses in fibers. *Opt. Express* 20, 19836-19849 (2012).

[15] Bosco, G., Carena, A., Curri, V., Poggiolini, P., & Forghieri, F. Performance Limits of Nyquist-WDM and CO-OFDM in High-Speed PM-QPSK Systems. *IEEE Phot. Technol. Lett.* 22, 1129-1131 (2010).

[16] Schmogrow, R. et al. 512QAM Nyquist sinc-pulse transmission at 54 Gbit/s in an optical bandwidth of 3 GHz. *Opt. Express* 20, 6439-6447 (2012).

[17] Proakis, J. G., & Salehi, M. *Digital Communications*. Fifth Edition, McGraw-Hill, 2008.

[18] Nakazawa, M., Toshihiko, H., Peng, R. & Pengyu, G. Ultrahigh-speed "orthogonal" TDM transmission with an optical Nyquist pulse train. *Opt. Express* 20, 1129-1139 (2012).

[19] Schmogrow, R. et al. 150 Gbit/s real-time Nyquist pulse transmission over 150 km SSMF enhanced by DSP with dynamic precision. *Optical Fiber Communication Conference (OFC*-2012), OM2A.6 (2012).

[20] Vedadi, A., Shoaie, M. A. & Bres, C. S. Near-Nyquist optical pulse generation with fiber optical parametric amplification. *Opt. Express* 20, 27344-27354 (2012).

[21] Nguyen Tan, H., Inoue, T., & Namiki, S. Pass-Drop Operations of 4×172 Gb/s Nyquist OTDM-WDM over Cascade of WSSs Using Distributed Matched Filtering. *Optical Fiber Communication Conference/National Fiber Optic Engineers Conference* 2013, JW2A.50 (2013).

[22] Hu, H., Wang, J., Ji, H., Palushani, E., Galili, M., Hansen Mulvad, H., Jeppesen, P., & Oxenlowe, L. Nyquist filtering of 160 GBaud NRZ-like DPSK signal. *Optical Fiber Communication Conference/National Fiber Optic Engineers Conference* 2013, JW2A.61 (2013).

[23] Pawlak, M. & Rafajlowicz, E. On Restoring Band-Limited Signals. *IEEE Trans. Inf. Theory* 40, 1490-1503 (1994).

[24] Valley, G. C. Photonic analog-to-digital converters. *Opt. Express* 15, 1955-1982 (2007).

[25] Supradeepa, V. R. et al. Comb-based radiofrequency photonic filters with rapid tenability and high selectivity. *Nat. Photonics* 6, 186-194 (2012).

[26] Song, M., et al. Reconfigurable and Tunable Flat-Top Microwave Photonic Filters Utilizing Optical Frequency Combs. *IEEE Phot. Technol. Lett.* 23, 1618-1620 (2011).

[27] Hamidi, E., Leaird, D. E. & Weiner, A. M. Tunable Programmable Microwave Photonic Filters Based on Optical Frequency Comb. *IEEE Trans. Microw. Theory Techn.* 58, 3269-3278 (2010).

[28] Santagiustina, M. et al. All-optical signal processing using dynamic Brillouin gratings. *Sci. Rep.* 3, article number: 1594 (2013).

[29] Pestov, D. et al. Optimizing the Laser-Pulse Configuration for Coherent Raman Spectroscopy. *Science* 316, 265-268 (2007).

[30] PreuBler, S. et al. Quasi-light-storage based on time-frequency coherence. *Opt. Express* 17, 15790-15798 (2009).

[31] Schneider, T, Jamshidi, K. &PreuBler, S. Quasi-Light Storage: A Method for the Tunable Storage of Optical Packets With a Potential Delay-Bandwidth Product of Several Thousand Bits. *J. Lightw. Technol.* 28, pp. 2586-2592 (2010).

[32] Schmogrow, R. et al. Real-time OFDM or Nyquist pulse generation—which performs better with limited resources? *Opt. Express* 20, B543-B551 (2012).

[33] Schmogrow, R. et al. Pulse-Shaping With Digital, Electrical, and Optical Filters—A comparison. *J. Lightw. Technol.* 31, 2570-2577 (2013).

[34] Soto, M. A. et al. Generation of Nyquist sinc pulses using intensity modulators. *CLEO:* 2013, CM4G.3 (2013).

[35] Jinno, M. et al. Spectrum-efficient and scalable elastic optical path network: architecture, benefits and enabling technologies. *IEEE Commun. Mag.* 47, 66-73 (2009).

[36] Christodoulopoulos, K., Tomkos, I. & Varvarigos, E. A. Elastic bandwidth allocating in flexible OFDM-based optical networks. *J. Lightw. Technol.* 29, 1354-1366 (2011).
[37] Bracewell, R. N. *The Fourier Transform and Its Applications*. Third edition, McGraw-Hill, 2000.
[38] Washburn, B. R. et al. Fiber-laser-based frequency comb with a tunable repetition rate. *Opt. Express* 12, 4999-5004 (2004).
[39] Kubina, P. et al. Long term comparison of two fiber based frequency comb systems. *Opt. express* 13. 904-909 (2005).
[40] Ruehl, A., Marcinkevicius, A., Fermann, M. E. & Hartl, I. 80 W, 120 fs Yb-fiber frequency comb. *Opt. Lett.* 35, 3015-3017 (2010).
[41] Bartels, A., Gebs, R., Kirchner, M. S. & Diddams, S. A. Spectrally resolved optical frequency comb from a self-referenced 5 GHz femtosecond laser. *Opt. Lett.* 32, 2553-2555 (2007).
[42] Kippenberg, T. J., Holzwarth, R. & Diddams, S. A. Microresonator-Based Optical Frequency Combs. *Science* 332, 555-559 (2011).
[43] Del'Haye, P. et al. Optical frequency comb generation from a monolithic microresonator. *Nature* 450, 1214-1217 (2007).
[44] Koos, C. et al. Terabit's data transmission using optical frequency combs. *Proc. SPIE* 8600, 860009 (2013).
[45] Pfeifle, J. et al. Microresonator-Based Frequency Comb Generator as Optical Source for Coherent WDM Transmission. *Optical Fiber Communication Conference/National Fiber Optic Engineers Conference* 2013, OW3C.2 (2013).
[46] Wu, R., Supradeepa, V. R., Long, C. M., Leaird, D. E., & Weiner, A. M. Generation of very flat optical frequency combs from continuous-wave lasers using cascaded intensity and phase modulators driven by tailored radio frequency waveforms. *Opt. Letters* 35, 3234-3236 (2010).
[47] Ozharar, S., Quinlan, F., Ozdur, I., Gee, S., & Delfyett, P. J. Ultraflat optical comb generation by phase-only modulation of continuous-wave light. *IEEE Phot. Technol. Lett.* 20, 36-38 (2008).
[48] Chang, Q., Gao, J., & Su, Y. Generation of optical comb frequency signal with high spectral flatness using two cascaded optical modulators. *Optical Fiber Communication & Optoelectronic Exposition & Conference.* 1, 1-3 (2008).
[49] Yamamoto, T., Komukai, T., Suzuki, K., & Takada, A. Spectrally flattened phase-locked multi-carrier light generator with phase modulators and chirped fibre Bragg grating. *Electron Lett.* 43, 1040-1042 (2007).
[50] Yamamoto, T., Komukai, T., Suzuki, K., & Takada, A. Multicarrier Light Source With Flattened Spectrum Using Phase Modulators and Dispersion Medium. *J. Lightw. Technol.* 27, 4297-4305 (2009).
[51] Yang, T. et al. Comparison analysis of optical frequency comb generation with nonlinear effects in highly nonlinear fibers. *Opt. Express* 21, 8508-8520 (2013).
[52] Ataie, V., Kuo, B. P. P., Myslivets, E., & Radic, S. Generation of 1500-tone, 120 nm-wide ultraflat frequency comb by single CW source. *Proc. Optical Fiber Communication & Optoelectronic Exposition & Conference.* PDP5C.1 (2013).
[53] Tong, Z., Wiberg, A. O. J., Mylivets, E., Kuo, B. P. P., Alic, N., & Radic, S. Spectral linewidth preservation in parametric frequency combs seeded by dual pumps. *Opt. Express* 20, 17610-17619 (2012).
[54] Jiang, Z., Seo, D. S., Leaird, D. E. & Weiner, A. M. Spectral line-by-line pulse shaping. Opt. Lett. 30, 1557-1559 (2005).
[55] Jiang, Z., Huang C.-B., Leaird, D. E. & Weiner, A. M. Optical arbitrary waveform processing of more than 100 spectral comb lines. *Nat. Photonics* 1, 463-467 (2007).
[56] Sadeev, T. S., & Morozov, 0. G. Investigation and analysis of electro-optical devices in implementation of microwave photonic filters. *Proc. SPIE.* 8410, 841007 (2012).
[57] Geng, J. et al. Highly stable low-noise Brillouin fiber laser with ultranarrow spectral linewidth. *IEEE Phot. Technol. Lett.* 18, 1813-1815 (2006).
[58] Wooten, E. L. et al. A review of lithium niobate modulators for fiber-optic communications systems. *IEEE J. Sel. Topics Quantum Electron.* 6, 69-82 (2000).

The invention claimed is:

1. A system for producing a plurality of Sinc shaped pulses in the time domain including:
a light source for providing an input light signal having an input frequency; and
at least one spectrum shaper for producing the plurality of Sinc shaped pulses from the input light signal; wherein
the spectrum shaper includes an amplitude modulator, at least one radio-frequency generator and a bias voltage generator,
the amplitude modulator being configured to generate a plurality of spectral lines in the frequency domain from (i) the input light signal and (ii) at least one radio-frequency signal provided by the at least one radio-frequency generator,
the amplitude modulator being further configured to set the plurality of spectral lines in-phase with each other using an input bias voltage from the bias voltage generator and a voltage amplitude of the at least one radio-frequency signal, and being additionally configured to equalize the amplitude of the plurality of spectral lines using the input bias voltage from the bias voltage generator and the voltage amplitude of the at least one radio-frequency signal to produce a substantially rectangular shaped frequency comb whose spectral lines are of substantially equal phase and equalized amplitude.

2. The system according to claim 1, wherein the system includes at least two interconnected spectrum shapers.

3. The system according to claim 2, wherein the system includes at least three interconnected spectrum shapers.

4. The system according to claim 1, wherein the at least one spectrum shaper is configured to generate at least two spectral lines.

5. The system according to claim 4, wherein the at least one spectrum shaper is configured to generate at least three spectral lines.

6. The system according to claim 4, wherein the at least one spectrum shaper includes a synchroniser to synchronise the at least one spectrum shaper to another spectrum shaper in order to provide a locked phase relation between the generated spectral lines.

7. A communications system, communications network, optical spectroscopy system, all-optical sampling device or photonic analogue-to-digital converter which comprises the system according to claim 1.

8. A method for producing a plurality of Sinc shaped pulses in the time domain including the steps of:
(a) generating, using at least one amplitude modulator, a plurality of spectral lines in the frequency domain from (i) an input light signal and (ii) at least one radio-frequency signal provided by at least one radio-frequency generator, (b) setting the plurality of spectral lines in-phase with each other using an input bias voltage from a bias voltage generator and a voltage amplitude of the at least one radio-frequency signal, and (c) equalizing the amplitude of the plurality of spectral lines using the input bias voltage from the bias voltage generator and the voltage amplitude of the at least one radio-frequency signal to produce a substantially rectangular shaped frequency comb whose spectral lines are of substantially equal phase and equalized amplitude.

9. The method according to claim 8, wherein a plurality of amplitude modulators generate the plurality of spectral lines.

10. The method according to claim 8, wherein at least two amplitude modulators are used to generate the plurality of spectral lines and the amplitude modulators are interconnected.

11. The method according to claim 8, wherein the at least one amplitude modulator is configured to generate at least two spectral lines.

12. The method according to claim 11, wherein the at least one amplitude modulator is configured to generate at least three spectral lines.

13. The method according to claim 11, wherein the at least one amplitude modulator is associated with a radio-frequency generator, and wherein the radio-frequency generator includes a synchroniser to synchronise the radio-frequency generator to another radio-frequency generator to set a locked phase relation between the generated spectral lines.

* * * * *